(12) United States Patent
Fujimoto

(10) Patent No.: US 6,717,734 B2
(45) Date of Patent: Apr. 6, 2004

(54) IMAGE FORMING LENS UNIT AND IMAGE READING APPARATUS USING THE SAME

(75) Inventor: Hisayoshi Fujimoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 19 days.

(21) Appl. No.: 10/356,175

(22) Filed: Jan. 30, 2003

(65) Prior Publication Data

US 2003/0112522 A1 Jun. 19, 2003

Related U.S. Application Data

(62) Division of application No. 09/890,317, filed as application No. PCT/JP00/00333 on Jan. 24, 2000.

(30) Foreign Application Priority Data

Jan. 29, 1999 (JP) ............................................. 11-22128
Feb. 19, 1999 (JP) ............................................. 11-41641

(51) Int. Cl.$^7$ .............................................. G02B 27/10
(52) U.S. Cl. ..................................... 359/619; 359/621
(58) Field of Search ................................ 359/619, 621, 359/365, 620; 156/153

(56) References Cited

U.S. PATENT DOCUMENTS

| | | | | |
|---|---|---|---|---|
| 4,788,587 A | * | 11/1988 | Bitoh | 358/502 |
| 4,961,802 A | | 10/1990 | Otsuki et al. | 156/153 |
| 5,489,993 A | | 2/1996 | Ito et al. | 358/482 |
| 5,604,606 A | * | 2/1997 | Miyashita et al. | 358/474 |
| 5,648,874 A | * | 7/1997 | Sawaki et al. | 359/622 |

FOREIGN PATENT DOCUMENTS

| | | |
|---|---|---|
| JP | 55-083007 | 6/1980 |
| JP | 56-161511 | 12/1981 |
| JP | 56-168609 | 12/1981 |
| JP | 61-226701 | 10/1986 |
| JP | 63-017402 | 1/1988 |
| JP | 01-124818 | 5/1989 |
| JP | 02-006123 | 1/1990 |
| JP | 04-129126 | 11/1992 |
| JP | 04-326658 | 11/1992 |
| JP | 05-068132 | 3/1993 |
| JP | 09-274177 | 10/1997 |
| JP | 10-170703 | 6/1998 |
| JP | 10-225995 | 8/1998 |
| JP | 11-008742 | 1/1999 |

* cited by examiner

Primary Examiner—Hung X. Dang
Assistant Examiner—Joseph Martinez
(74) Attorney, Agent, or Firm—Merchant & Gould P.C.

(57) ABSTRACT

A lens unit (U15) includes a housing (45), an upper and a lower lens arrays (A1', A2'), and a first and a second prisms (4A, 4B). Each of the lens arrays includes a plurality of lenses, a light-shielding member (4), and a plurality of positioning projections, all of which are integral with each other. Downwardly traveling light which enters the housing (45) through a first slit (45c) formed at an upper portion of the housing (45) is directed upward by the first prism (4A) to pass through the two lens arrays (A1', A2'). The light is then directed downward by the second prism (4B) to exit the housing through a second slit (45d) formed at a lower portion of the housing (45).

11 Claims, 34 Drawing Sheets

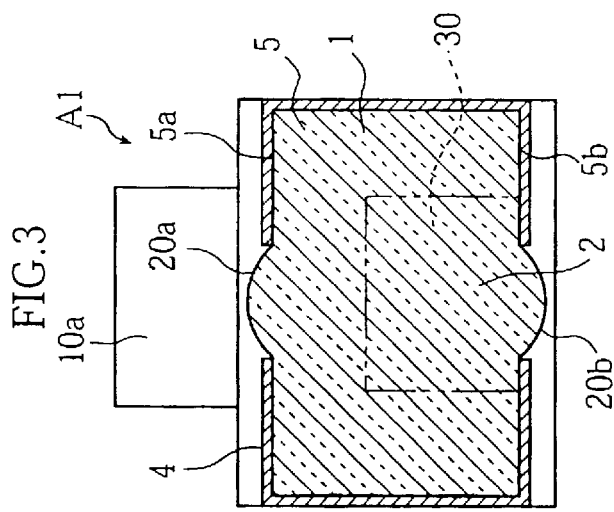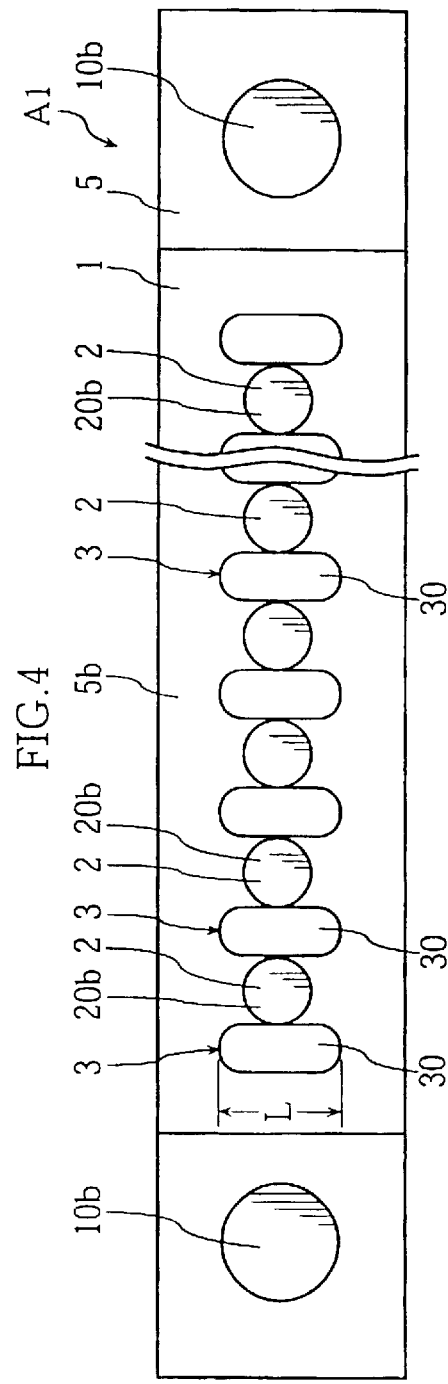

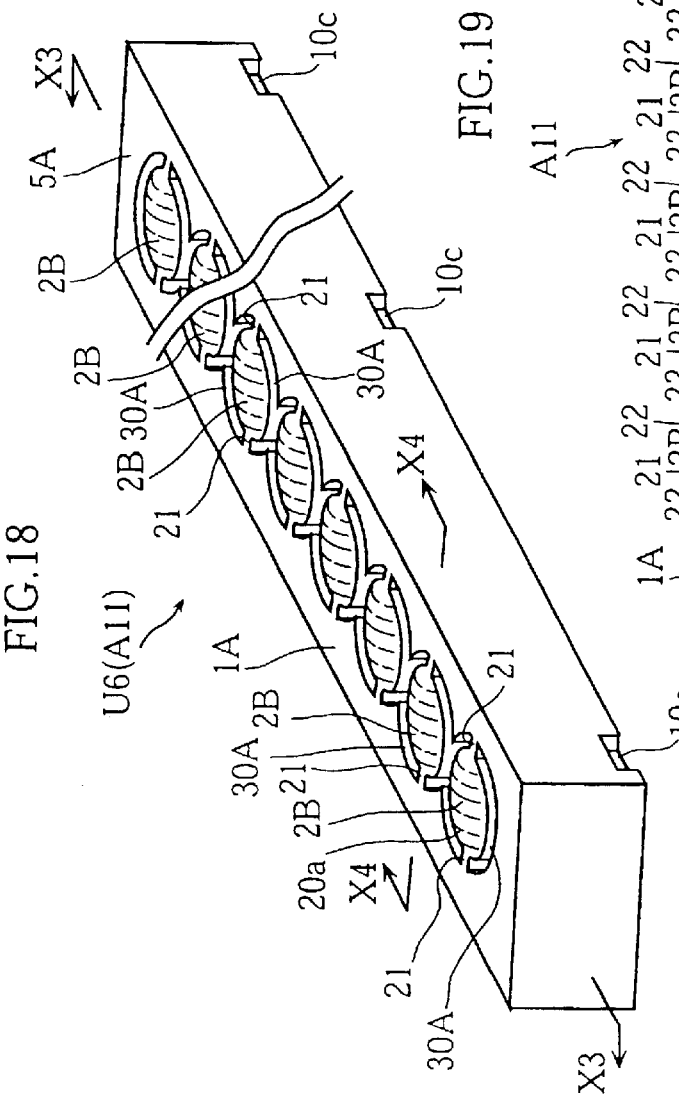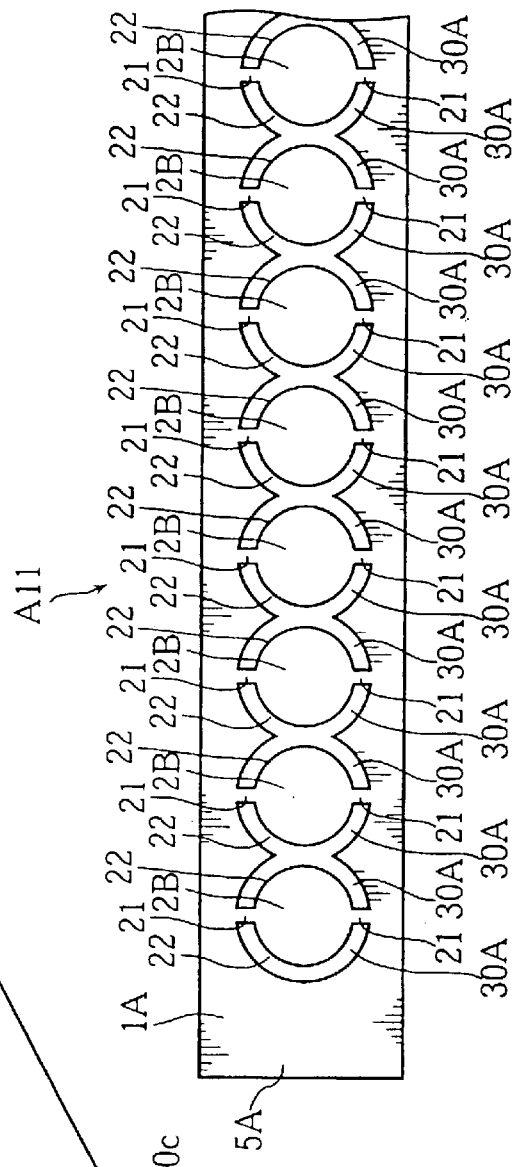
FIG.18
FIG.19

IMAGE FORMING LENS UNIT AND IMAGE READING APPARATUS USING THE SAME

"This application is a divisional of application Ser. No. 09/890,317, filed Jul. 27, 2001, which is a National Stage Application of PCT/JP00/00333, filed Jan. 24, 2000, which application(s) are incorporated herein by reference."

TECHNICAL FIELD

The present invention relates to an image-forming lens unit for use in an image reading apparatus for example. The present invention also relates to an image reading apparatus incorporating such a lens unit.

BACKGROUND ART

Conventionally, various types of image reading apparatus are used for reading an image carried on a document. For example, there exists an image reading apparatus which reads an image of a document line by line (each line extending in the primary scanning direction). This type of image reading apparatus includes a plurality of light receiving elements arranged in a row. Accordingly, for forming an image of a document on these light receiving elements, a lens unit (lens array) need be used which includes a plurality of lenses arranged in a row extending in the primary scanning direction.

FIG. 42 illustrates an example of prior art image reading apparatus. The image reading apparatus includes a case 100 having a hollow portion, and a transparent plate 101 fitted in an upper portion of the case. The transparent plate 101 contacts a document D which is pressed against the plate by a platen roller 102. By the rotation of the platen roller 102, the document D is transferred in a direction indicated by an arrow Td (which is perpendicular to the primary scanning direction). The transparent plate 101 has an upper surface which includes a linear image read area Sa extending in the primary scanning direction. For irradiating the image read area Sa with light, a light source 103 is provided in the case 100. A lens array 104 is provided below the image reading area Sa. The lens array 104 includes a plurality of lenses 105 arranged in a row extending in the primary scanning direction. As shown in FIG. 42, light from the image read area Sa is collected by the lenses 105 to be received by a plurality of light receiving elements 106 provided thereunder. Similarly to the lenses 105, the plurality of light receiving elements 106 are arranged in a row extending in the primary scanning direction.

FIG. 43 is a perspective view showing the entirety of the lens array 104. As shown in this figure, the plurality of lenses 105 are held by an elongated holder portion 104a.

Each lens 105 is a columnar self focusing lens (selfoc lens) the refractive index of which varies depending on the distance from the central axis. Therefore, as shown in FIG. 44, light traveling within the lens 105 follows a tortuously bent path. By using such a lens, an object a-b and its image a'-b' become equal in orientation and size.

In a prior art method for making the lens array 104, prior to the formation of the holder 104a, lenses 105 are formed. Thereafter, the holder 104a are so formed by resin molding (insert molding) as to embed the lenses 105. Thus, in the prior art method, the formation of the plurality of lenses 105 and the molding of the holder 104 are performed in separate process steps. This method is disadvantageous because the lens array 104 cannot be made efficiently.

The above-described problem becomes more serious due to the fact that a large number of lenses 105 are necessary for making a lens array 104 and that each lens 105 is very small. That is, each lens 105 needs to be precisely positioned relative to the holder 104a. For the lens array 104 which deals with a large number of small lenses, it is clearly very difficult to perform such positioning precisely and efficiently.

The image reading apparatus as shown in FIG. 42 also has the following problems.

For reading an image at a high resolution, a document image need be formed by the lenses 105 without blurring. For this purpose, it is necessary to precisely set a distance La between the upper surface 105a of each lens 105 and the document G to a predetermined value. However, in an actual image reading process, the document G may rise from the transparent plate 101 so that the distance La may become longer than the predetermined length. Such a problem occurs more often in a hand-held scanner type image reading apparatus which does not include a platen roller.

In the prior art apparatus, therefore, the focal depth of each lens 105 is set large so that the image reading can be performed at a high resolution even when the distance La becomes slightly longer than the focal distance.

However, for making the focal depth of the lenses 105 large, the distance La need be set long. Further, when the focal depth is made large, the focal distance of each lens 105 becomes longer, so that a distance Lb (the distance between the lower surface 105b of each lens 105 and each light receiving element 106) need be made longer. As a result, in the prior art image reading apparatus, the distance between the transparent plate 101 and the light receiving elements 94 becomes long, which increases the size of the image reading apparatus.

DISCLOSURE OF THE INVENTION

An object of the present invention is to provide a lens unit which is capable of eliminating or at least lessening the above-described problems.

Another object of the present invention is to provide an image reading apparatus utilizing such a lens unit. A lens array which is provided in accordance with a first aspect of the present invention comprises: a body including a plurality of lenses and a holder portion for holding the lenses; and separating means for optically separating the plurality of lenses from each other; wherein the plurality of lenses and the holder portion are formed of a light-permeable resin and integral with each other.

In a preferred embodiment, the body includes an upper surface, and a lower surface opposite to the upper surface, and at least one of the upper and the lower surfaces is provided with a plurality of projections or recesses corresponding to the plurality of lenses.

Preferably, the separating means includes light-shielding portions for absorbing light.

In a preferred embodiment, the body includes a plurality of hollows provided adjacent to the plurality of lenses. The light-shielding portions include a dark-colored coating applied to wall surfaces of the body which define the hollows. Herein, the dark color may preferably be black. However, the present invention is not limited thereto, and any other color may be applicable if only it blocks or absorbs light.

Instead of the dark-colored coating, the light-shielding portions may be formed by inserting dark-colored members into the hollows.

In a preferred embodiment, the hollows are so provided as not to penetrate through the body.

In another preferred embodiment, the hollows are so provided as to penetrate through the body.

The hollows may be arranged in a row. In this case, each of the hollows may extend linearly in a direction intersecting the row.

The plurality of hollows may be generally cylindrical for surrounding the plurality of lenses, respectively.

The plurality of hollows may be so formed as to make the plurality of lenses tapered.

In a preferred embodiment, the light-shielding portions include dark-colored members embedded in the body.

In a preferred embodiment, the light-shielding portions include portions of the body which are dark-colored.

Preferably, the lens array of the present invention further includes a light-shielding member for covering an outer surface of the holder portion.

In a preferred embodiment, the plurality of lenses are arranged in a matrix, and the body is in the form of a plate.

In accordance with a second aspect of the present invention, there is provided a lens array comprising: a plurality of lenses; and a holder portion for holding the plurality of lenses; the lens array further including a plurality of hollows located adjacent the plurality of lenses; wherein the plurality of lenses and the holder portion are formed of a light-permeable synthetic resin and integral with each other.

In accordance with a third aspect of the present invention, there is provided a lens unit comprising: a first lens array including a plurality of first lenses, a first holder portion for holding the first lenses, and first separating means for optically separating the first lenses from each other; and a second lens array including a plurality of second lenses, a second holder portion for holding the second lenses, and second separating means for optically separating the second lenses from each other. The first lenses and the first holder portion are formed of a light-permeable resin and integral with each other, and the second lenses and the second holder portion are formed of a light-permeable resin and integral with each other. The first lens array and the second lens array are laminated on each other so that each of the first lenses and a corresponding one of the second lenses are aligned on a common optical axis.

Preferably, the first and the second lens arrays are provided with positioning means for positioning the first and the second lens arrays relative to each other.

The first and the second lenses may be spherical lenses. Some of the first and the second lenses may be aspherical lenses.

In a preferred embodiment, the lens unit of the present invention further comprises a third lens array including a plurality of third lenses, a third holder portion for holding the third lenses, and third separating means for optically separating the third lenses from each other.

Preferably, the first and the second lenses are convex lenses and the third lenses are concave lenses. The third lenses are different in Abbe number from the first and the second lenses.

In accordance with a fourth aspect of the present invention, there is provided a lens unit comprising: at least one lens array including a plurality of lenses each of which has a first surface and a second surface; a housing for accommodating the lens array; a first opening provided in the housing at a position which is closer to the first surface than to the second surface; a second opening provided in the housing at a position which is closer to the second surface than to the first surface; a first light guide means for guiding light traveling through the first opening into the housing toward the second surface of the lens; and a second light guide means for guiding light emitted from the first surface of the lens toward the second opening.

In accordance with a fifth aspect of the present invention, there is provided a method of making a lens array. This method comprises: a first step of forming a plurality of lenses and a holder portion for holding the lenses by molding a light permeable resin; and a second step of providing separating means for optically separating the plurality of lenses from each other; wherein the plurality of lenses and the holder portion are integrally formed with each other in the first step.

In a preferred embodiment, a plurality of hollows are formed adjacent to the plurality of lenses in the first step, and dark-colored light-shielding members are provided in the plurality of hollows in the second step.

Preferably, in the first step, a plurality of lens arrays are collectively formed by resin molding using a mold having a plurality of cavities.

In a preferred embodiment, in the second step, a jig to which a dark-colored coating is applied is inserted in the hollows to transfer the coating onto wall surfaces defining the hollows.

Preferably, the method of making a lens array according to the present invention further comprises the step of applying a black coating to an outer surface of the holder portion after masking a light entering surface and a light emitting surface of each of the plurality of lenses.

In accordance with a sixth aspect of the present invention, there is provided an image reading apparatus comprising: a lens unit including a plurality of lenses for collecting light traveling from a linear image read area, each of the lenses having a first surface, and a second surface which is located farther from the image read area than the first surface; and a plurality of light receiving elements for receiving the collected light; wherein the image reading apparatus further includes a first light guide means for guiding light traveling from the image read area toward the second surface of said each lens, and a second light guide means for guiding light emitted from the first surface of said each lens toward the plurality of light receiving elements.

Preferably, the light traveling from the image read area passes one side of said each lens and then changes its traveling direction by the first light guide means to reach the second surface of the lens. Further, the light emitted from the first surface of the lens changes its traveling direction by the second light guide means to pass the other side of the lens to be received by the plurality of light receiving elements.

The first and the second light guide means may comprise a prism. Alternatively, the first and the second light guide means may comprise a plurality of mirrors.

In a preferred embodiment, the lens unit includes a first lens array and a housing for fixing the first lens array. The first lens array, the first light guide means, and the second light guide means are incorporated in the housing.

Preferably, the housing is dark-colored, and the plurality of light receiving elements are covered with the housing.

Preferably, the image reading apparatus according to the present invention further includes a light source for illuminating the image read area, a case for accommodating the light source and the plurality of light receiving elements. The first lens array, the first light guide means and the second light guide means are directly attached to the case.

Preferably, the lens unit includes a second lens array including a plurality of lenses, and the first and the second lens arrays are laminated on each other so that each lens of the first lens array and a corresponding one of the second lens array are aligned on a common optical axis.

Each of the plurality of lenses may comprise either a selfoc lens or a lens formed of optical fibers.

Other features and advantages of the present invention will become clearer from the detailed description given below with reference to the accompanying drawings.

BRIEF DESCRIPTION OF THE DRAWINGS

FIG. 3 is a view taken along lines X2—X2 in FIG. 1.

FIG. 4 is a bottom view of the lens array shown in FIG. 1.

FIG. 18 is a sectional view showing a lens array in accordance with a sixth embodiment of the present invention.

FIG. 19 is a plan view of a principal portion of the lens array shown in FIG. 18.

BEST MODE FOR CARRYING OUT THE INVENTION

Preferred embodiments of the present invention will be described below with reference to the accompanying drawings. Throughout the drawings, the elements which are identical or similar are designated by the same reference signs.

Reference is first made to FIGS. 1–4. These figures illustrate a lens unit U1 in accordance with a first embodiment of the present invention. The lens unit U1 in this embodiment includes a single lens array A1.

Figure 2:
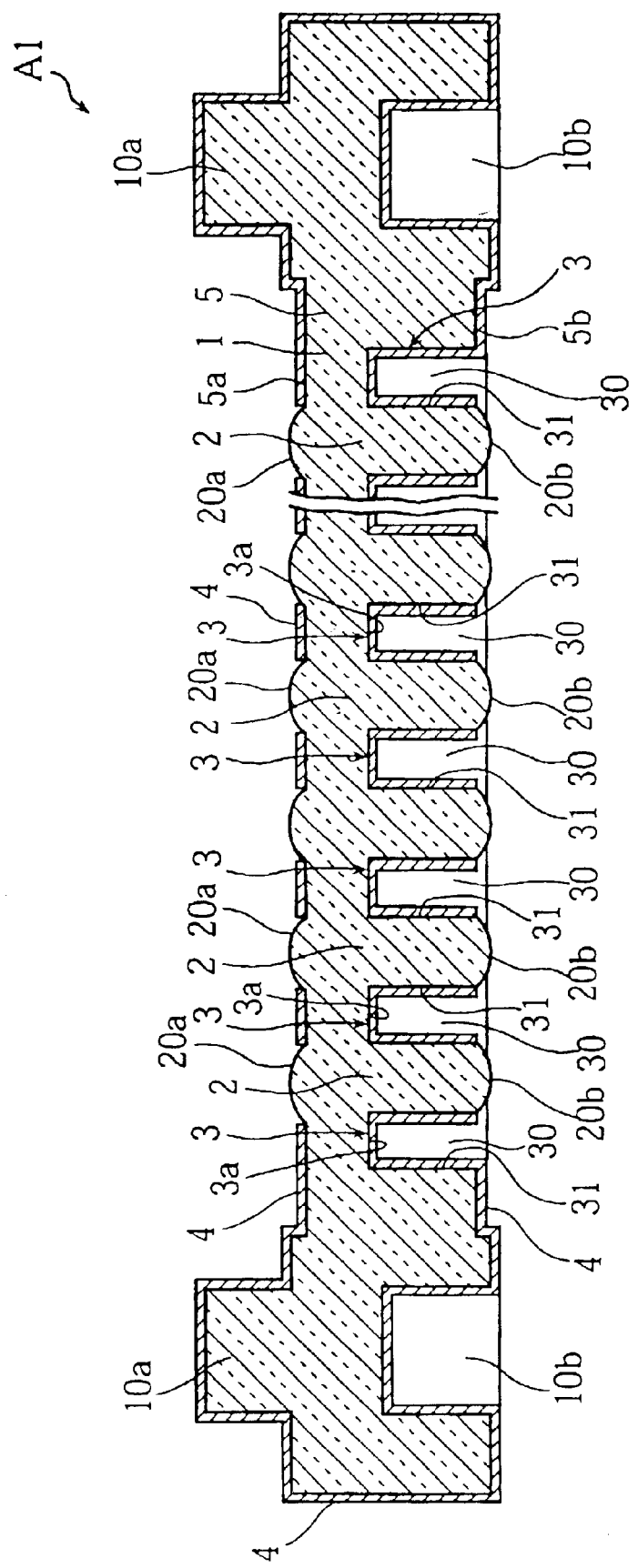
FIG. 2 is a sectional view taken along lines X1—X1 in FIG. 1.

The lens array A1 includes a body 5 which may be provided by molding a light-permeable synthetic resin (See FIG. 2). Examples of such light-permeable synthetic resin include PMMA (polymethyl methacrylate (methacrylate resin)) as an aclylic resin and PC (polycarbonate). The body 5 includes a holder portion 1, and a plurality of lenses 2 integrally formed in the holder portion. The plurality of lenses 2 are arranged at a predetermined pitch in a row extending longitudinally of the body 5.

Figure 1:
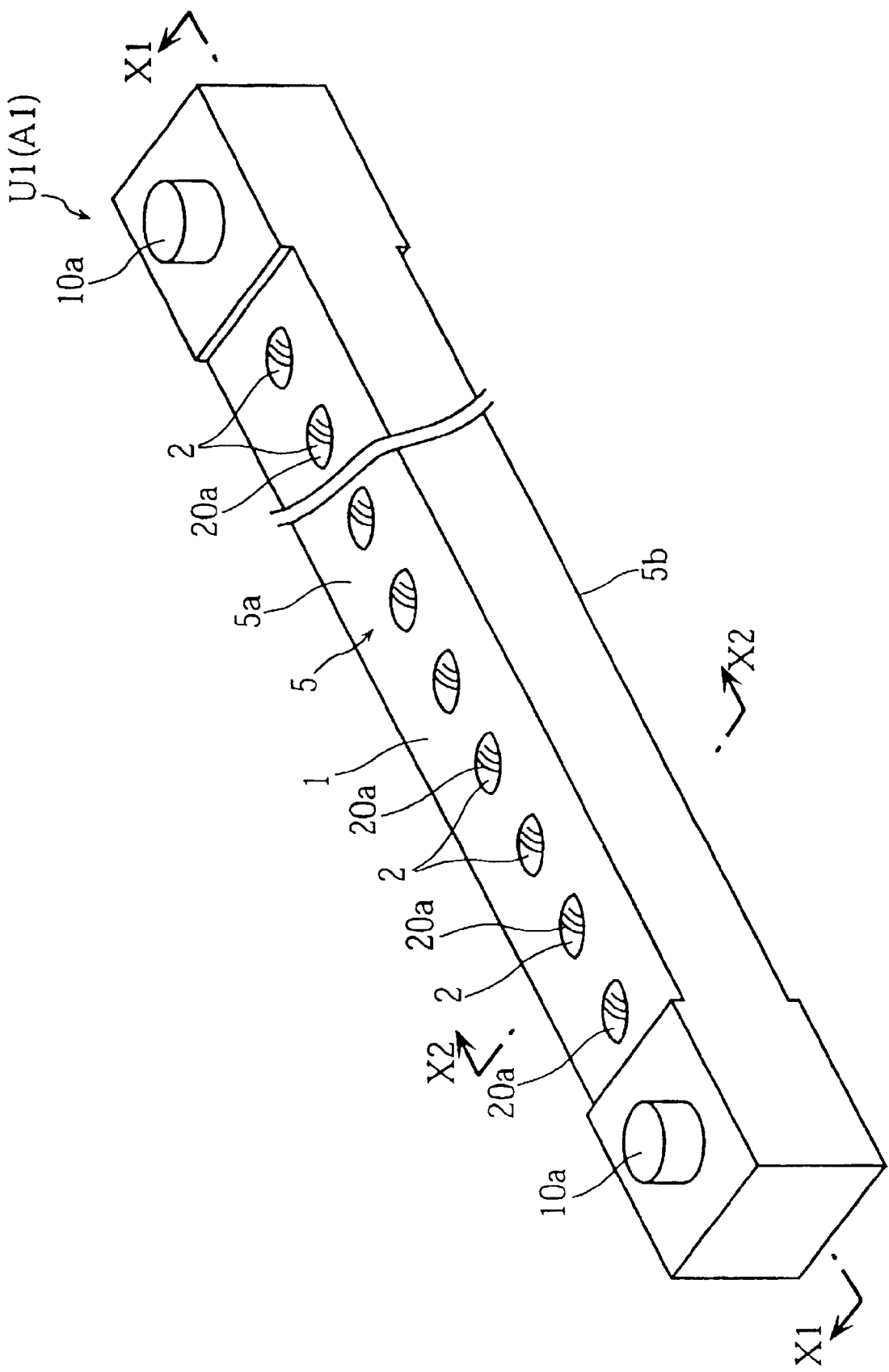
FIG. 1 is a perspective view showing a lens array in accordance with a first embodiment of the present invention.

As shown in FIGS. 1 and 2, the body 5 is generally in the form of a rectangular parallelepiped having an upper surface 5a and a lower surface 5b which are vertically spaced. Each of the lenses 2 has a convex upper surface 20a and a convex lower surface 20b. The upper surface 20a of the lens 2 projects upwardly from the upper surface 5a of the body 5, whereas the lower surface 20b of the lens 2 projects downwardly from the lower surface 5b of the body 5 (See also FIG. 3). With this structure, each lens 2 is double convex lens having an optical axis extending thicknesswise (vertical direction) of the body 5. The upper surface 20a and the lower surface 20b of each lens 2 may be either spherical or aspherical. However, the formation of an aspherical lens is more complicated than the formation of a spherical lens. Therefore, to make the upper surface 20a or the lower surface 20b aspherical may possibly cost higher than to make the surface spherical.

The lens array A1 further includes a plurality of light-shielding portions 3 formed on the body 5, and a light-shielding film 4 covering the outer surface of the holder portion 1. In FIG. 1 and FIG. 4, the light-shielding film 4 is not illustrated.

As clearly shown in FIG. 2, the holder portion 1 has longitudinally opposite ends each of which has an upper surface and a lower surface respectively formed with a projecting portion 10a and a recessed portion 10b. These portions are utilized for positioning the lens arrays when the lens array A1 is used in combination with another lens array. Each projecting portion 10a is generally identical, in configuration and size, to a corresponding recessed portion 10b.

As shown in FIG. 2, the lower surface 5b of the body 5 is formed with a plurality of hollows 30 arranged alternately with the plurality of lenses 2 (See also FIG. 4). Each of the hollows 30 has such a depth as not to penetrate through the holder portion 1. As clearly shown in FIG. 4, the hollow 30 is elongated widthwise of the holder portion 1 to have an appropriate length L. The light-shielding portions 3 are formed by coating a plurality of wall surfaces defining the hollows 30 with a black film 31.

The light-shielding film 4 may be formed by applying a black coating on the outer surface of the body 5 at portions except the lens surfaces 20a, 20b of each lens 2. As will be described later, it is possible to form the light-shielding film 4 and the coating film 31 constituting the light-shielding portions 3 in a common coating step. However, the light-shielding film 4 and the light shielding portions 3 may be formed in separate coating steps. Next, a method of making a lens array A1 will be described with reference to FIGS. 5~10.

Figure 5:
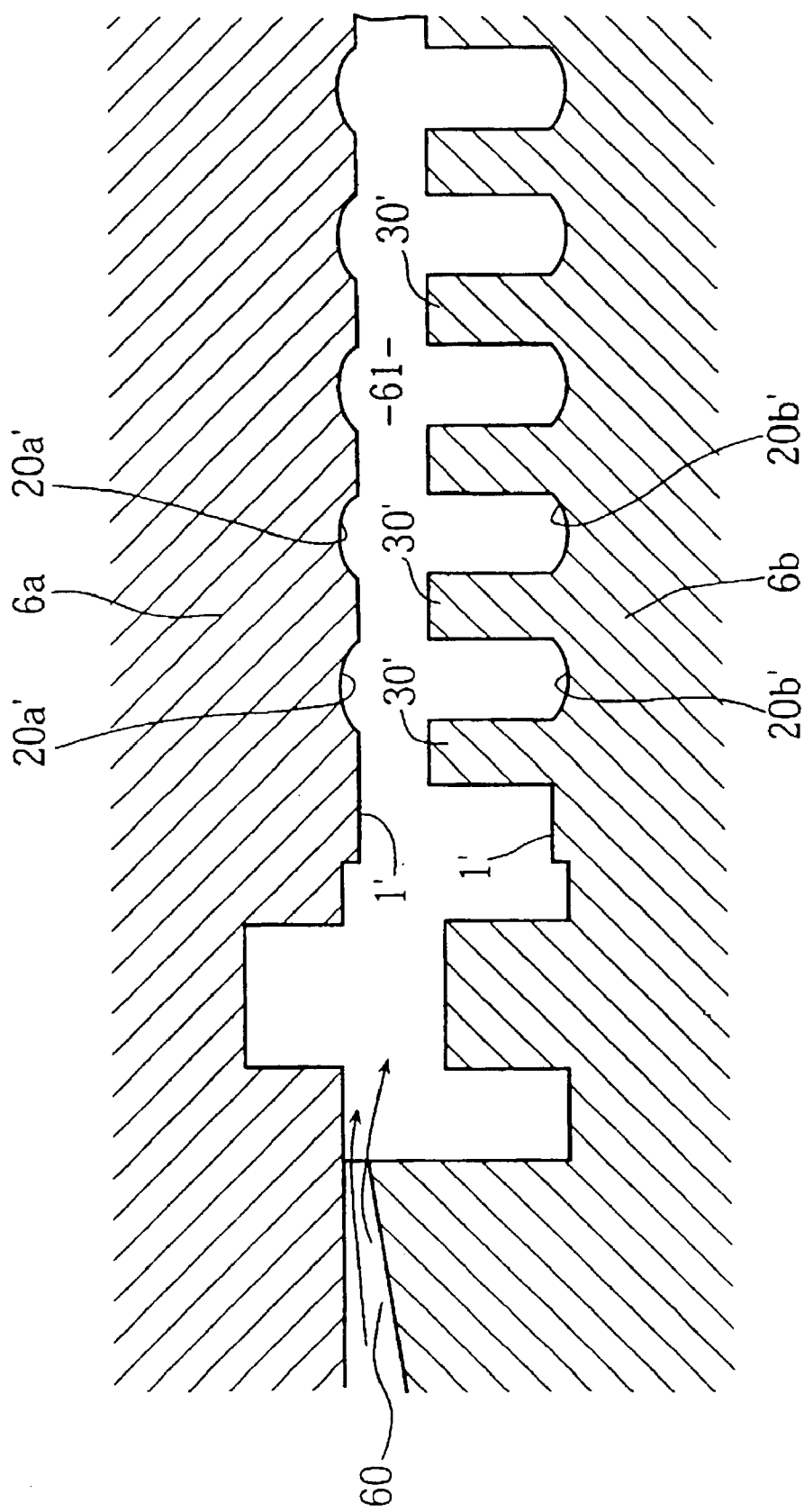
FIG. 5 is a sectional view of a principal portion in a step for molding the lens array of FIG. 1.
Figure 6:
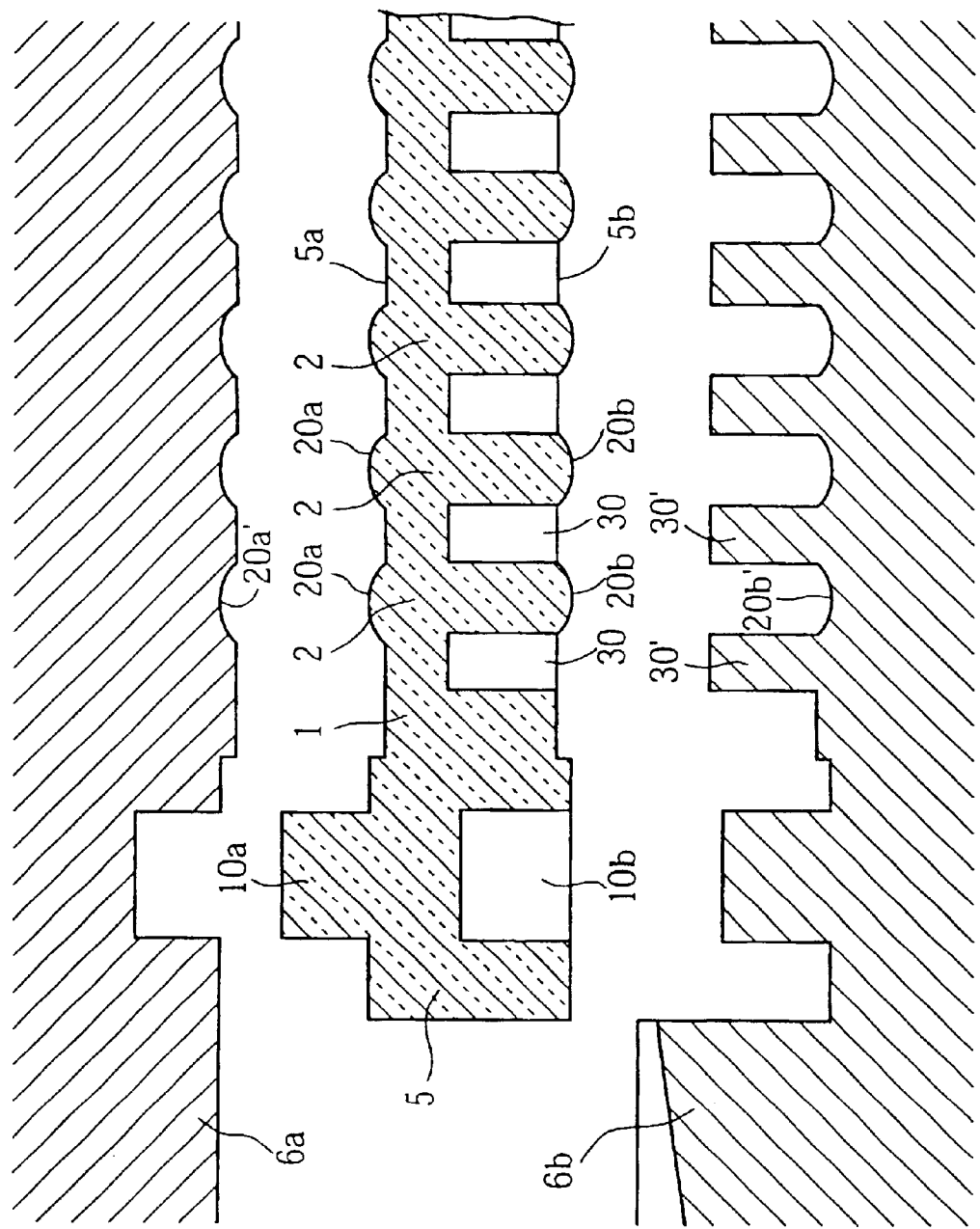
FIG. 6 is a sectional view of a principal portion in a step for molding the lens array of FIG. 1.
Figure 7:
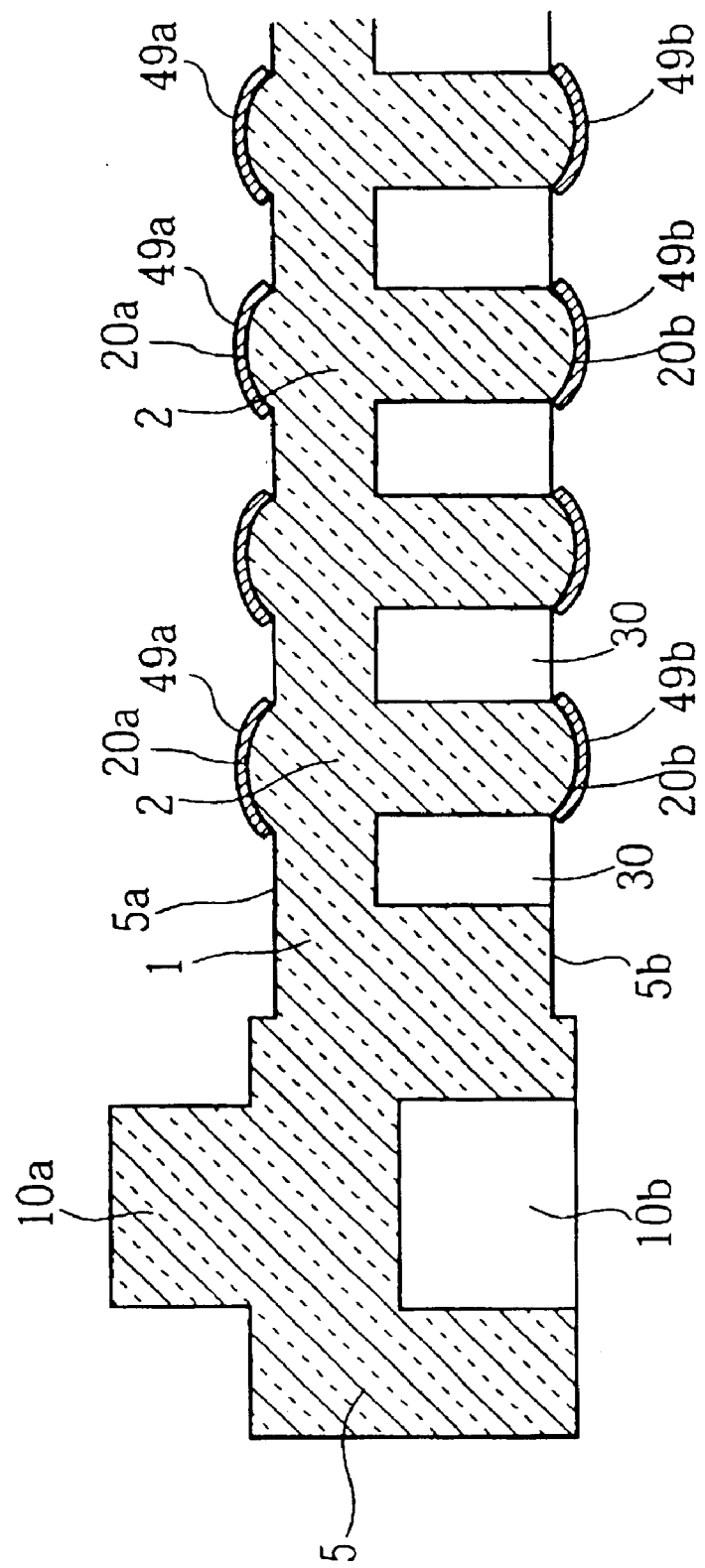
FIG. 7 is a sectional view of a principal portion in a step for coating the lens array of FIG. 1.

To provide the lens array A1, a body 5 is firstly molded. This process may be performed by utilizing a pair of upper and lower mold members 6a, 6b, as shown in FIG. 5. The mold 6a, 6b includes a plurality of recesses 20a', 20b' respectively corresponding to the convex surfaces 20a, 20b of each lens 2, a plurality of wall surfaces 1' for profiling the holder portion 1, and a plurality of projections 30' for forming the plurality of hollows 30. A light-permeable resin is injected through a feed passage 60 provided between the mold members 6a and 6b to fill a cavity 61 shown in FIG. 5. Thus, the body 5 of the lens array A1 as shown in FIG. 6 is obtained. Though not illustrated in FIG. 5, the mold members 6a, 6b include additional cavities which are identical to (or different from) the cavity 61 to simultaneously form a plurality of lens arrays.

After the body 5 is thus obtained, a black coating is applied to the body 5. In this coating process, masks 49a, 49b are disposed on the respective surfaces 20a, 20b of each lens 2. These masks 49a, 49b may be formed by utilizing a conventional method which is common in the field of semiconductor fabrication for patterning a photoresist on a substrate.

Figure 8:
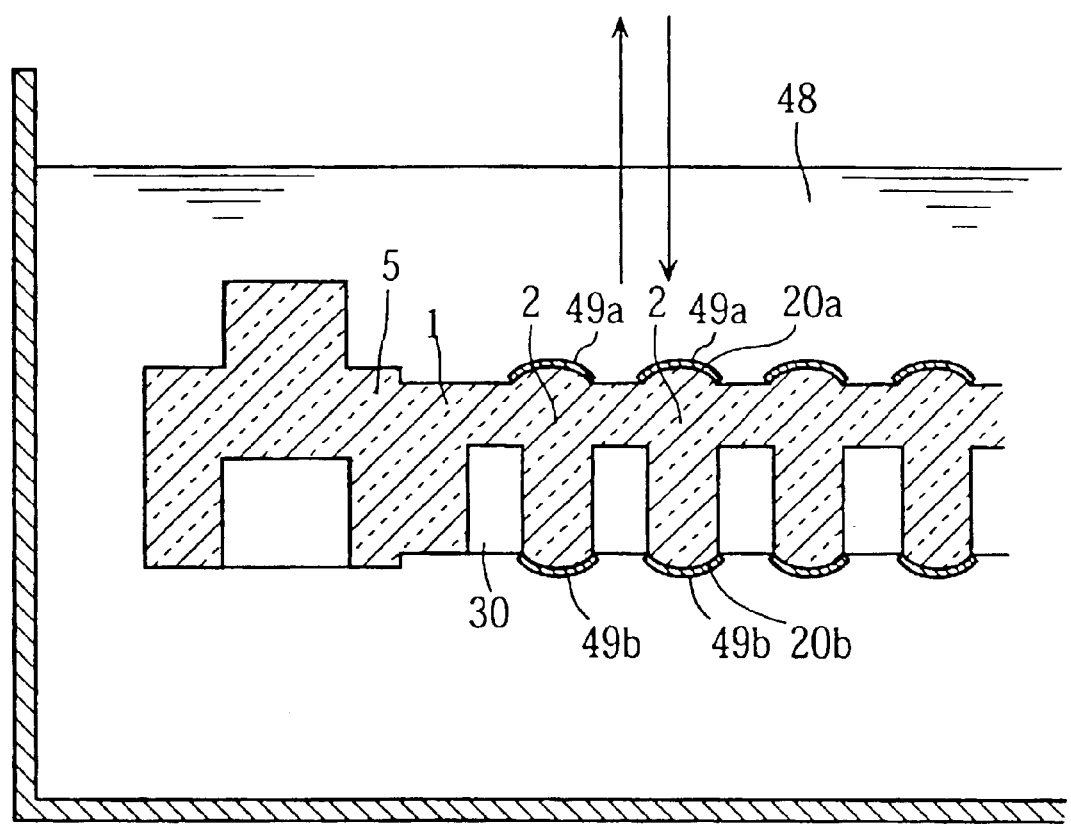
FIG. 8 is a sectional view of a principal portion in a step for coating the lens array of FIG. 1.

After the masks are provided, the body 5 is immersed into black coating liquid 48, as shown in FIG. 8. As a result, black coating is applied to the entire outer surface of the body 5 except the lens surfaces 20a, 20b of each lens 2. Thus, the light-shielding film 4 and the coating film 31 constituting the light-shielding portions 3 are simultaneously formed. After the formation of the coating film 31, the masks 49a, 49b are removed, thereby providing the lens array A1. The masks 49a, 49b may be removed by etching using an etchant or may be mechanically stripped off.

With the above-described coating method, it is possible to perform the coating of the body 5 in a single step. However, the above-described coating method may often be unfavorable in the case where each hollow 30 has a very small width, for example, because it takes a relatively long time for the coating material to enter such a narrow hollow.

Figure 9:
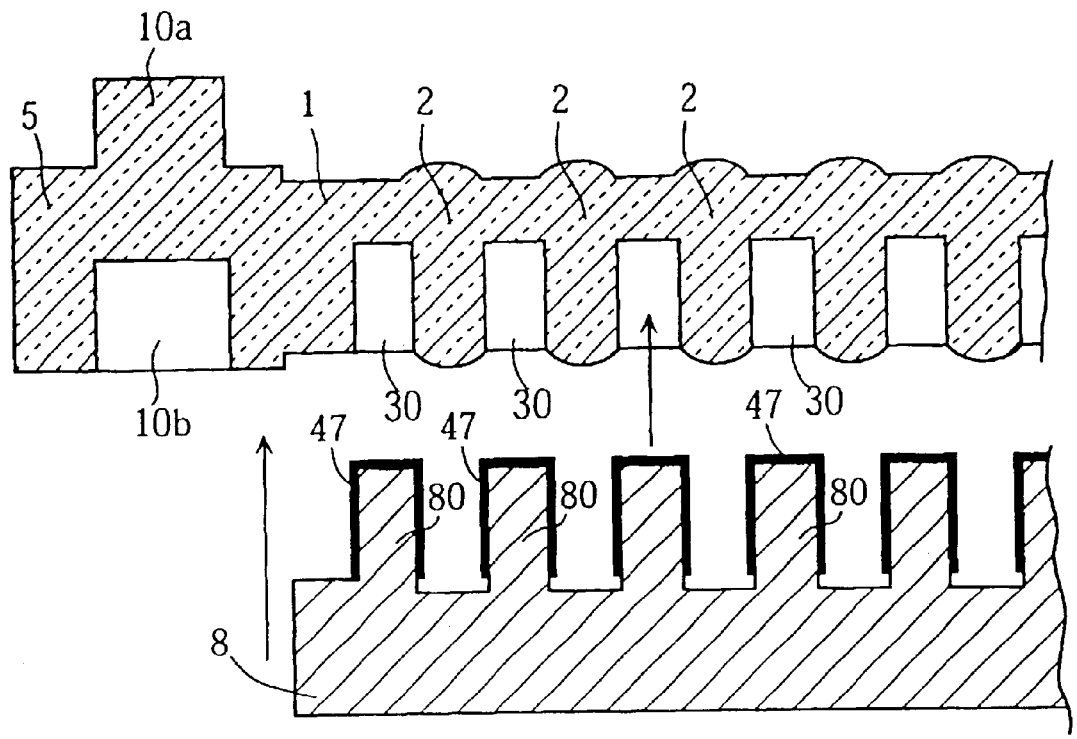
FIG. 9 is a sectional view showing another coating step.
Figure 10:
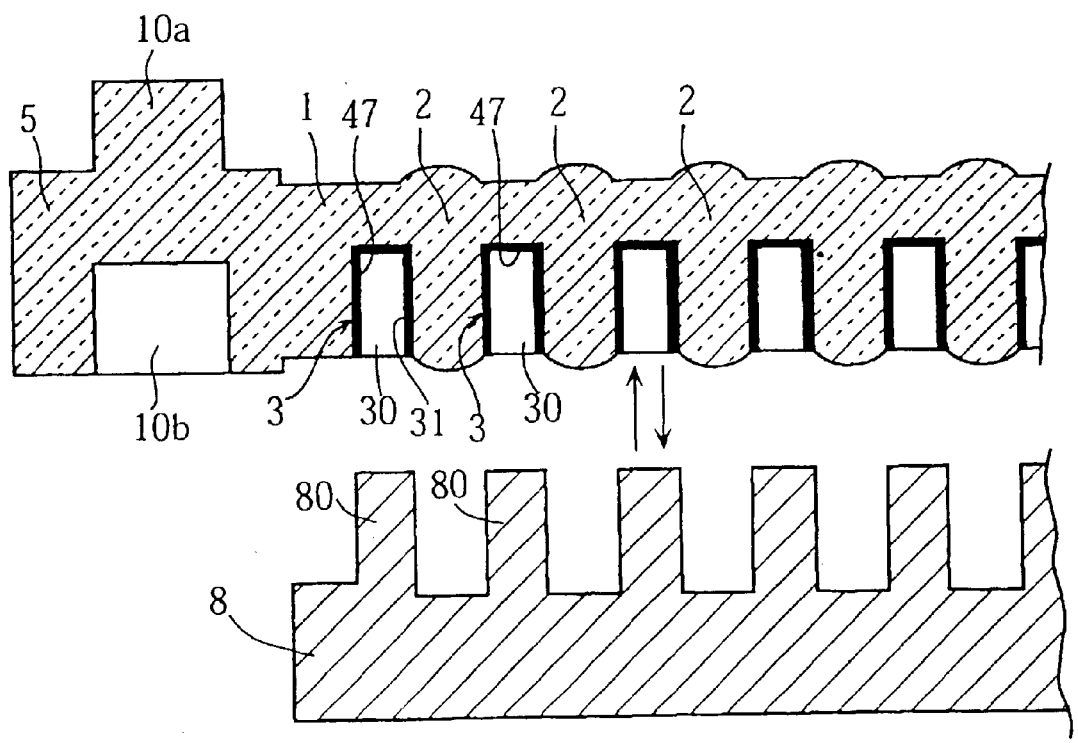
FIG. 10 is a sectional view of a principal portion in a step following the step shown in FIG. 9.

The above-described coating method may often be unfavorable because the light-shielding portions 3 and the light-shielding film 4 are different with respect to their expected functions. Specifically, the light-shielding film 4 is provided just for preventing external light from entering the holder portion 1, whereas the coating film 31 of each light-shielding portion 3 directly affects the direction of light progress traveling through each lens 2. Therefore, the light-shielding film 4 may be roughly coated in black, whereas the coating film 31 need be formed by dense black coating. In such a case, a coating jig 8 as shown in FIG. 9 maybe utilized to coat wall surfaces defining the hollows 30. The jig 8 includes a plurality of projections 80 which are generally identical in configuration and size to the projections 30' of the above-described mold member 6b. After a black coating 47 is applied to surfaces of the projections 80, the projections are fitted into the hollows 30 of the body 5 and then pulled out. As a result, as shown in FIG. 10, the black coating 47 is transferred to the entirety of the above-described wall surfaces, thereby providing the coating film 31.

Figure 11:
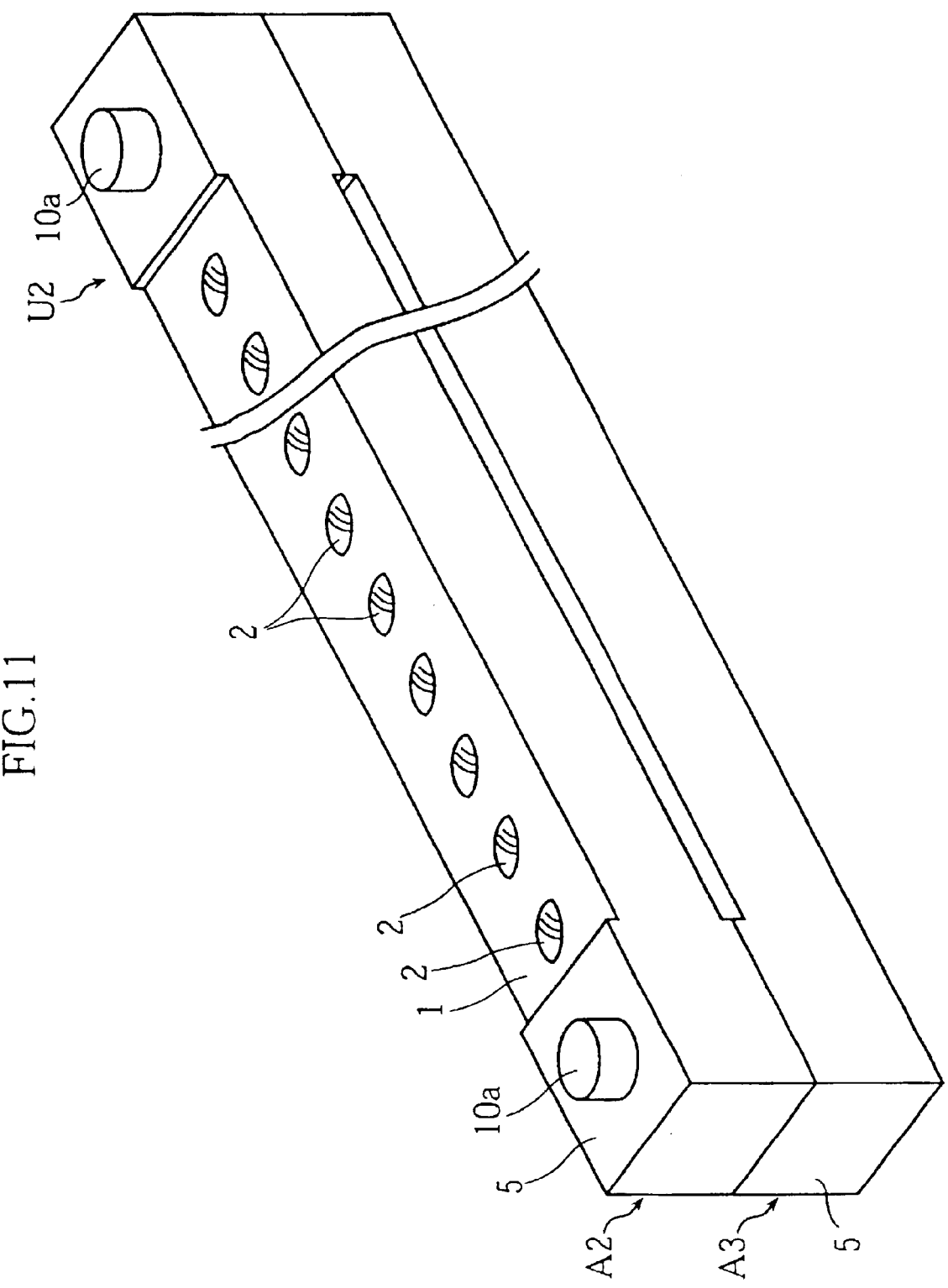
FIG. 11 is a perspective view showing a lens unit in accordance with a second embodiment of the present invention.
Figure 12:
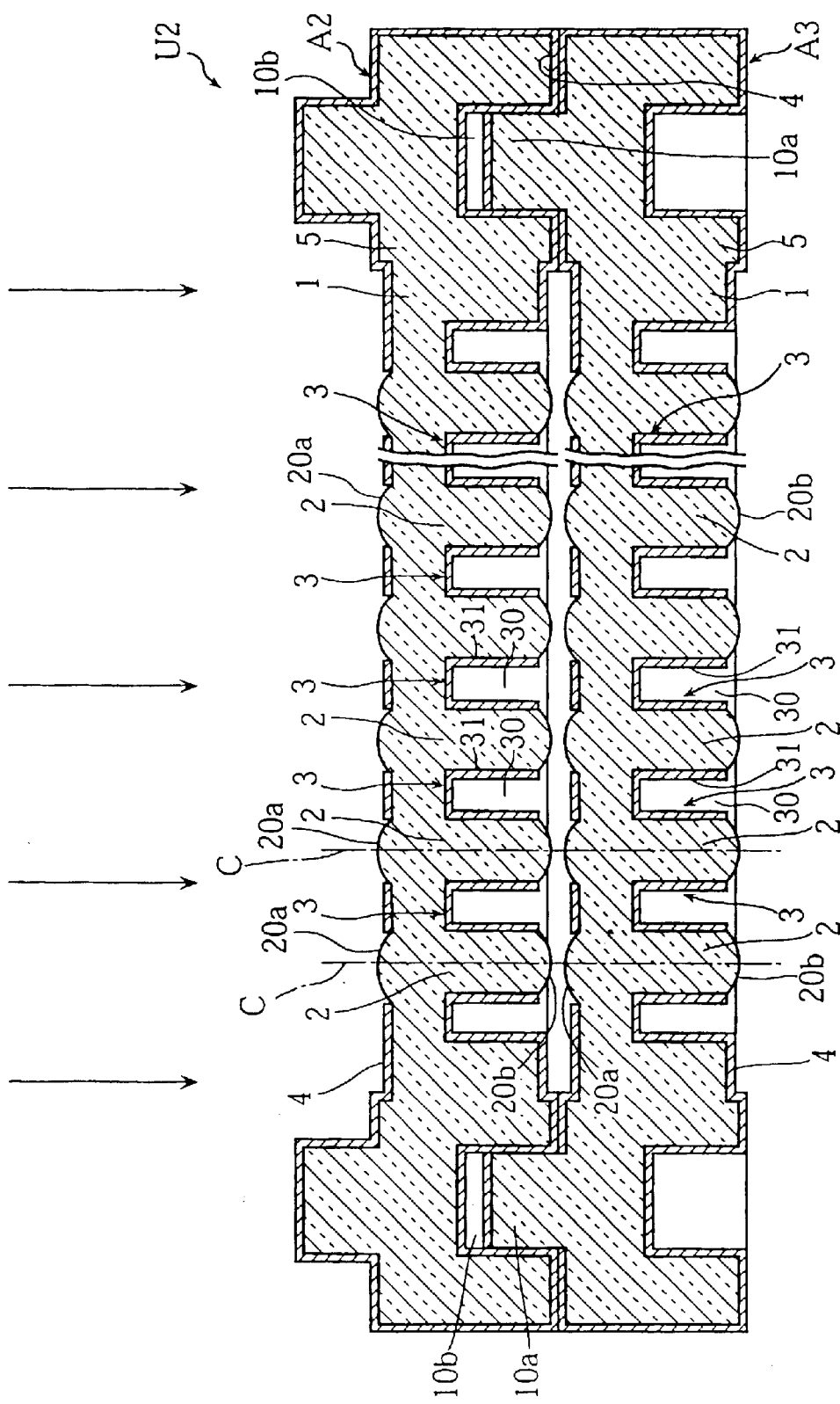
FIG. 12 is a sectional view of the lens unit shown in FIG. 11.

Next, reference is made to FIG. 11 and FIG. 12. These figures illustrate a lens unit U2 in accordance with a second embodiment of the present invention. The lens unit U2 in this embodiment comprises two lens arrays A2 and A3. Each of the lens arrays A2, A3 has a structure which is substantially identical with that of the above-described lens array A1 (See FIG. 1 and FIG. 2).

As previously described, the mold members 6a, 6b shown in FIG. 5 define a plurality of cavities for molding. Therefore, by using this mold, respective bodies 5 of the two lens arrays A2, A3 can be simultaneously formed of a same resin material. In this manner, the lens arrays A2 and A3 can be made of a material of a same composition and formed under same conditions including the degree of shrinkage during the molding. As a result, it is possible to reduce the difference in dimension of the two lens arrays As and A3, so that it is possible to precisely position the lenses 2 of the lens array A2 relative to the lenses 2 of the lens array A3.

As shown in FIG. 12, by fitting the projecting portions 10a of the lens array A3 into the recessed portions 10b of the lens array A2, the lens arrays A2, A3 are positioned longitudinally and widthwise relative to each other. This assembling of the lens arrays A2, A3 may be ensured by bonding these arrays with an adhesive for example. As shown in this figure, each lens 2 of the lens array A2 and the corresponding lens 2 of the lens array A3 are aligned on a common optical axis C. Since the light-shielding film 4 is illustrated as if it had a large thickness, two lenses 2 aligned on a common optical axis C are shown as largely spaced from each other. Actually, however, the light-shielding film 4 is thin, and the spacing is so small that the two lenses almost contact each other.

Figure 13:
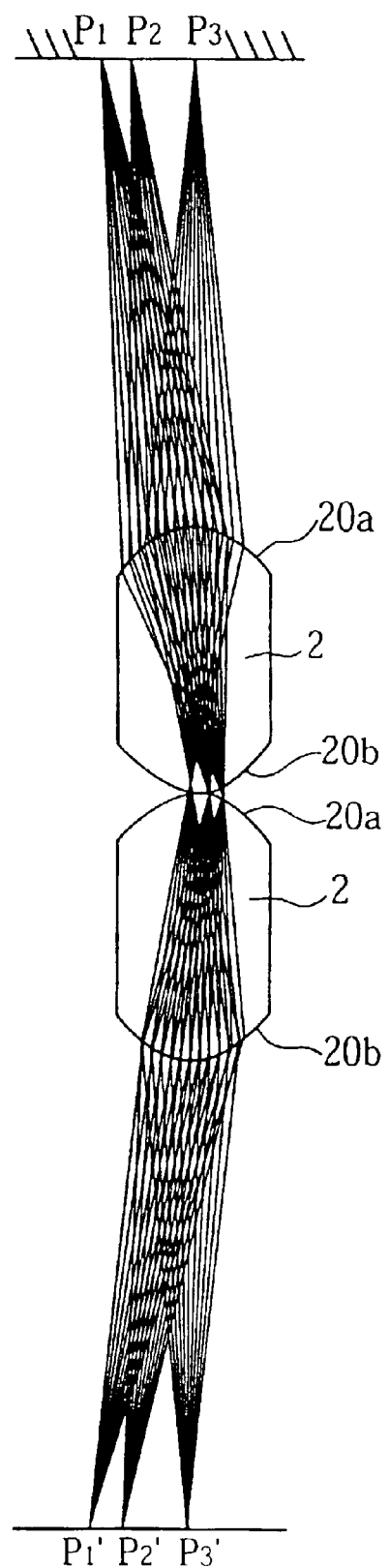
FIG. 13 illustrates the operation of the lens unit shown in FIG. 11.

Referring next to FIG. 13, the operation of two lenses 2 aligned on a common optical axis C will be described. As shown in this figure, due to the combination of the two lenses 2, it is possible to collect light traveling from points P1, P2, and P3 at their symmetrical points P1', P2', and P3', respectively. This image forming operation can be also obtained even if the curvature of the lens surfaces 20a, 20b of the two lenses 2 differ from each other.

Figure 14:
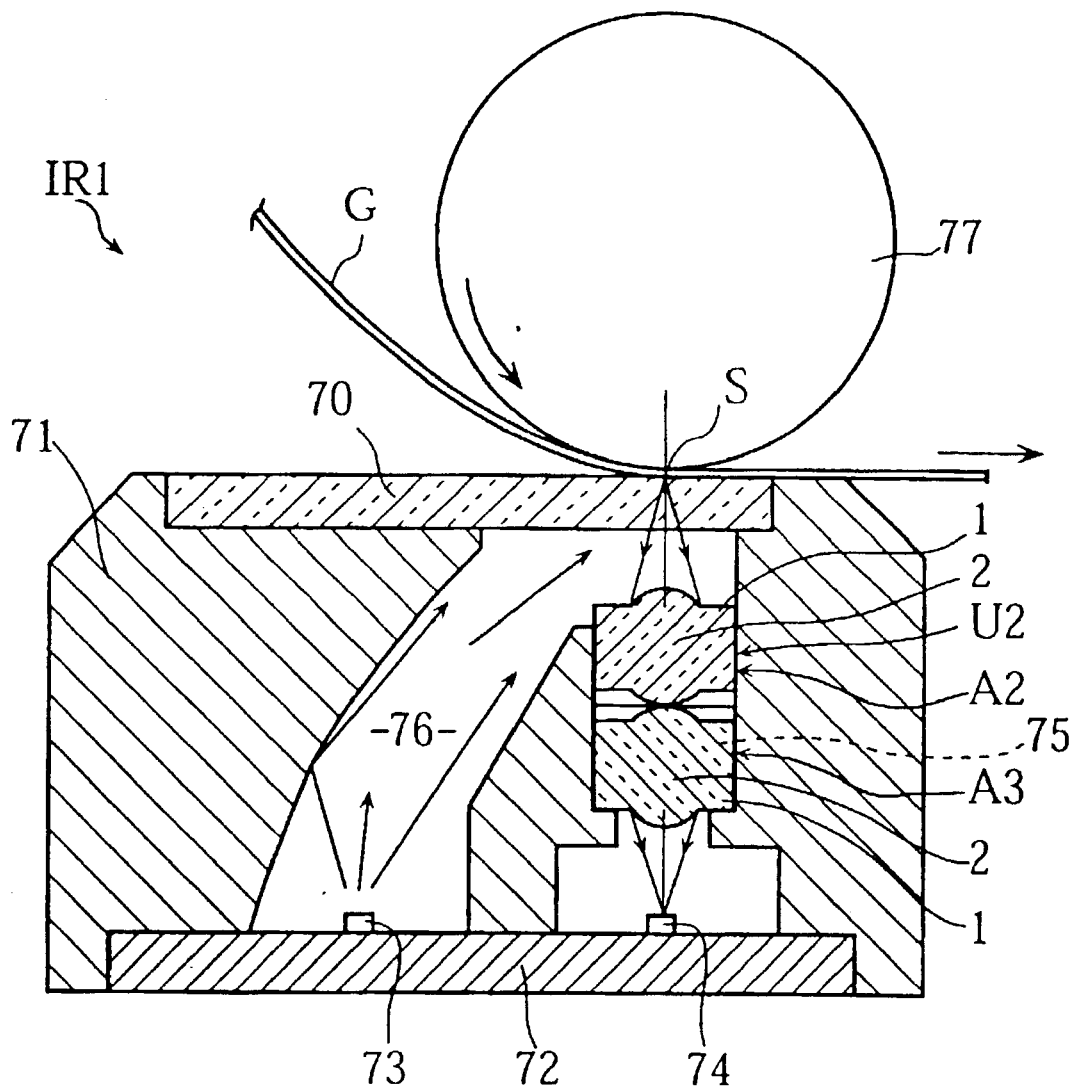
FIG. 14 is a schematic sectional view showing an image reading apparatus utilizing the lens unit in accordance with the second embodiment.

FIG. 14 is a sectional view schematically illustrating an example of image reading apparatus utilizing the above-described lens unit U2. The illustrated image reading apparatus IR1 includes a transparent plate 70, a case 71 formed of a synthetic resin for supporting the transparent plate 70 at its upper portion, and a substrate 72 mounted at a bottom of the case 71. The substrate 72 has a surface which is provided with a plurality of light sources 73 (e.g. light emitting diodes) arranged at a predetermined pitch in a row extending longitudinally (primary scanning direction) of the substrate 72, and a plurality of light receiving elements 74 arranged in the same direction as the light sources 73. Upon receiving light, each light receiving element 74 for photo-electric conversion outputs signals (image signal) corresponding to the receiving amount of light.

The above-described lens unit U2 is disposed between the transparent plate 70 and the light receiving elements 74. The lens unit U2 is fitted in a groove 75 formed in the case 71 so that the longitudinal direction thereof coincides with the primary scanning direction. On an obverse surface of the transparent plate 70, a linear image reading area S is defined which opposes the lenses 2 of the lens unit U2. Light emitted from the light sources 73 travels through an illumination path 76 to be directed to the image read area S. A platen roller 77 for transferring a document G is disposed above the image read area S.

When the image reading apparatus IR1 is actuated, light is emitted from the light sources 73 to illuminate the image read area S. The light is reflected by the document G and then enters the lens unit U2. The light thus entered is collected by a plurality of lenses 2 of the lens unit U2 to form an image of the document on the light receiving elements 74 without magnifying (or reducing) or inverting the original image. As shown in FIG. 12, the holder portion 1 of the lens unit U2 is covered with the black light-shielding film 4. Therefore, the light reflected by the document G does not pass through the holder portion 1. Thus, the plurality of light receiving elements 74 receive light only through the lenses 2 of the lens unit U2.

In fact, as shown in FIG. 12, when the lens unit U2 receives light from above, light enters each lens 2 of the lens array A2 in various directions. Therefore, light entering one lens 2 of the lens array A2 may travel within the lens 2 in a direction intersecting the optical axis C. According to the present invention, such light is blocked by the light-shielding portions 3. Thus, it is possible to prevent light entering one lens 2 from subsequently entering an adjacent lens 2. Therefore, so-called cross talk can be prevented from occurring between the plurality of lenses 2. The black coating film 31 of the light-shielding portions 3 absorb almost all of the received light. Therefore, light reaching the coating film 31 is not irregularly reflected toward the inside of the lens 2. Such an advantage can be obtained similarly by the lens array A3.

In using the image reading apparatus IR1, the temperature of the lens unit U2 (and the peripheral members) varies so that the lens arrays A2, A3 thermally expand. However, the bodies 5 of the lens arrays A2, A3 are made of a same material, thereby having a same linear expansion coefficient. Therefore, warp deformation due to bimetal effect does not occur with respect to the lens arrays A2, A3. Further, since the projecting portions 10a and the recessed portions 10b are fitted, the lens arrays A2 and A3 are unlikely to deviate positionally from each other. Therefore, it is also possible to prevent the respective optical axes of corresponding lenses 2 of the lens arrays A2 and A3 from deviating from each other. As a result, with the use of the lens unit U2, it is possible to form a clear image of the document G onto the plurality of the light receiving elements 74, thereby providing a read image with high resolution.

As described above, the lens arrays A2, A3 are made by a simple method. (After resin-molding the bodies 5 using mold members 6a, 6b, a black coating is applied to the bodies 5.) Accordingly, the lens unit U2, which is the combination of the lens arrays A2 and A3, can be made easily at a low manufacturing cost. Accordingly, it is also possible to decrease the manufacturing cost of the entire image reading apparatus IR1.

Figure 15:
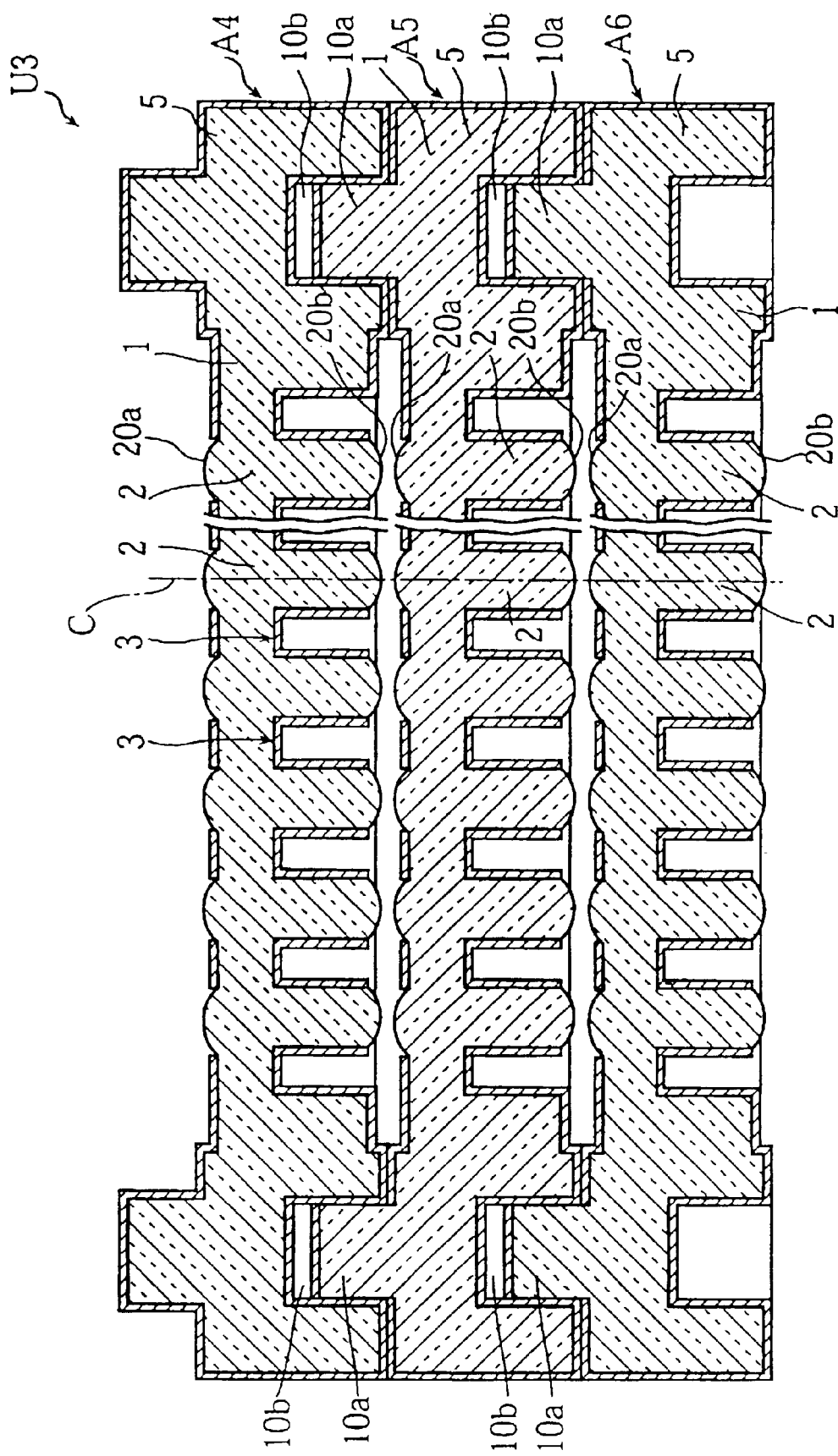
FIG. 15 is a sectional view showing a lens unit in accordance with a third embodiment of the present invention.

Next, reference is made to FIG. 15. This figure is a sectional view showing a lens unit U3 in accordance with a third embodiment of the present invention. The lens unit U3 comprises a combination of three lens arrays A4, A5 and A6. Each lens array is (substantially) identical to the lens array A1 shown in FIG. 2.

Also with this structure, it is possible to form an actual size erect image of a document image by each three lenses 2 aligned on a common axis C. Further, as compared with the combination of only two lens arrays, the curvature of the upper surface 20a and the lower surface 20b of each lens 2 can be made smaller. Accordingly, the aberration of lenses 2 can be reduced so that it is possible to form a clearer image. In the present invention, one lens unit may comprise four or more lens arrays.

Figure 16:
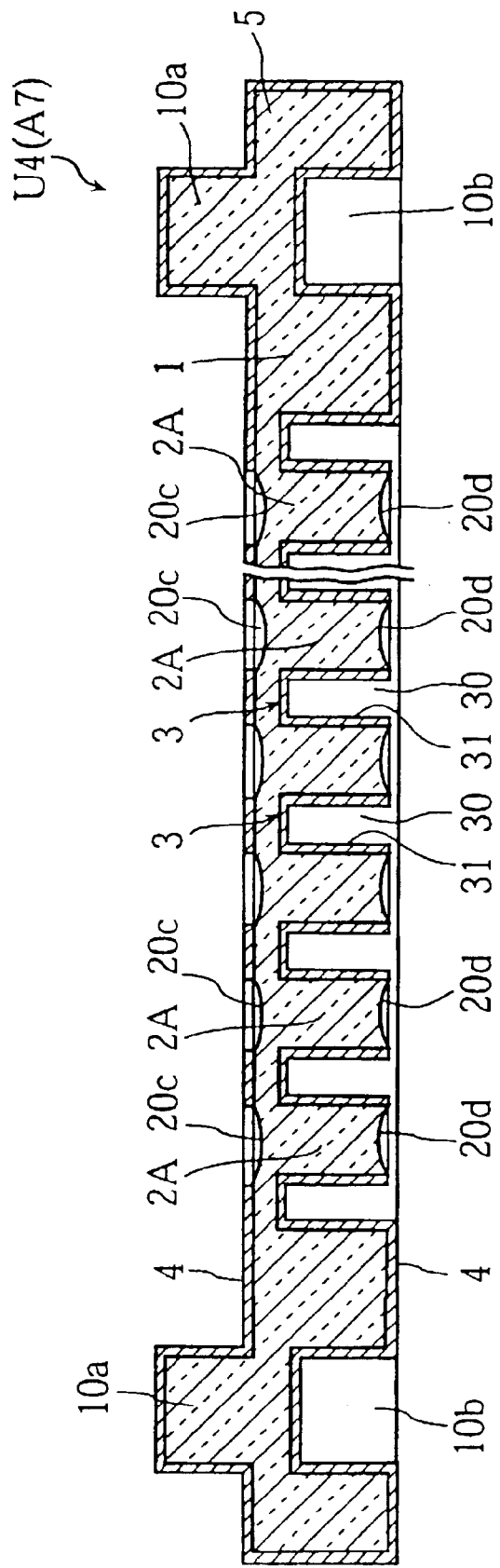
FIG. 16 is a sectional view showing a lens array in accordance with a fourth embodiment of the present invention.

FIG. 16 is a sectional view showing a lens unit U4 in accordance with a fourth embodiment of the present invention. The lens unit U4 includes a single lens array A7. The lens array A7 is generally identical to the lens array A1 shown in FIG. 2 except that each lens 2A has a concave upper surface 20c and a concave lower surface 20d. The upper surface 20c and the lower surface 20d may be either spherical or aspherical.

Figure 17:
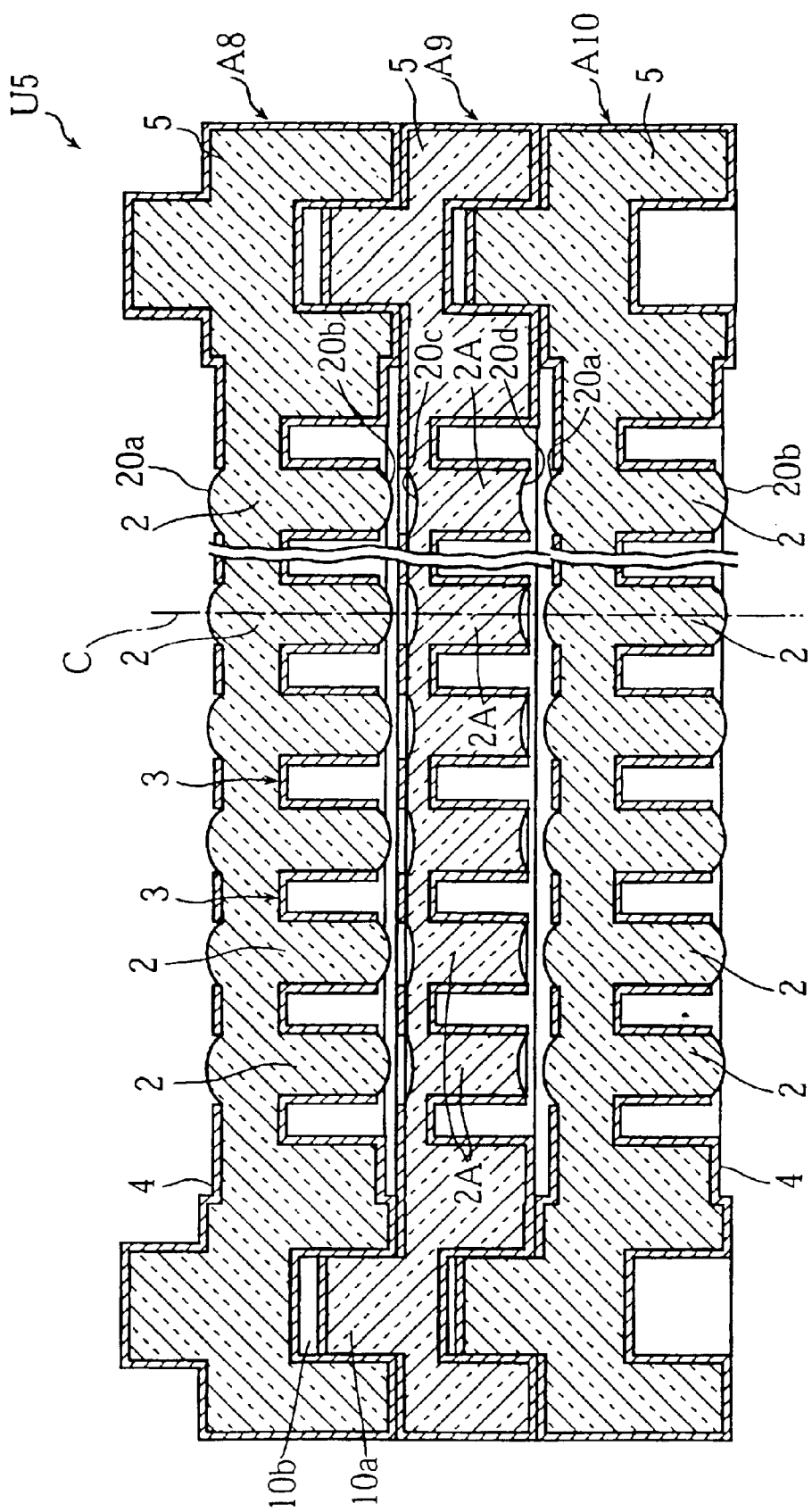
FIG. 17 is a sectional view showing a lens unit in accordance with a fifth embodiment of the present invention.

FIG. 17 is a sectional view showing a lens unit U5 in accordance with a fifth embodiment of the present invention. The lens unit U5 comprises a combination of three lens arrays A8, A9 and A10. The upper lens array A8 and the lower lens array A10 are (substantially) identical to the lens array A1 shown in FIG. 2. The middle lens array A9 sandwiched between the lens arrays A8 and A10 is (substantially) identical to the lens array A7 shown in FIG. 16. The lenses 2 of the lens arrays A8, A10 may be formed of PMMA for example, whereas lenses 2A of the lens array A9 may be formed of PC for example. The lenses 2 and the lenses 2A are different in Abbe number (reciprocal of dispersive power).

In the lens unit U5, each three lenses aligned on a common optical axis C are a combination of lenses (lens system) of various Abbe numbers. Therefore, the lens system serves as an achromatic lens system. Specifically, color aberration caused by two lenses 2 (convex lenses) can be eliminated by the lens 2A (concave lens). Of course, it is possible to form an actual size erect image by the combination of a convex lens and a concave lens. Therefore, the lens unit U5 may be suitably used for color image forming.

In the fifth embodiment described above, both the upper and the lower surfaces 20a, 20b of each lens 2 of the lens array A8 (and A10) are convex. Alternatively, either one of these surfaces may be concave or flat. The upper surface 20c or the lower surface 20d of each lens of the lens array A9 may be convex or flat.

Next, reference is made to FIGS. 18–21. These figures illustrate a lens unit U6 in accordance with a sixth embodiment of the present invention. The lens unit U6 includes a single lens array A11.

The lens array A11 has an elongated body 5A which includes a holder portion 1A and a plurality of lenses 2B. A plurality of hollows 30A are formed around the lenses 2B. Each of the hollows 30A penetrates the body 5A in the thickness direction (vertical direction). As clearly shown in FIG. 19, each hollow 30A, which is generally semicircular, merges with an adjacent hollow 30A at respective central portions. In the figures, each hollow 30A is depicted as if it had a relatively large width. However, it is preferable that the opening width of each hollow 30A is as narrow as possible so that light traveling from above or below the lens array A11 is prevented from easily passing through the hollow 30A.

Two semicircular hollows 30A are formed around each of the lenses 2B. Therefore, most portions of each lens 2B are separated from the holder portion 1A. As shown in FIG. 19, two connecting portions 21 are provided for joining each lens 2B to the holder portion 1A.

Figure 20:
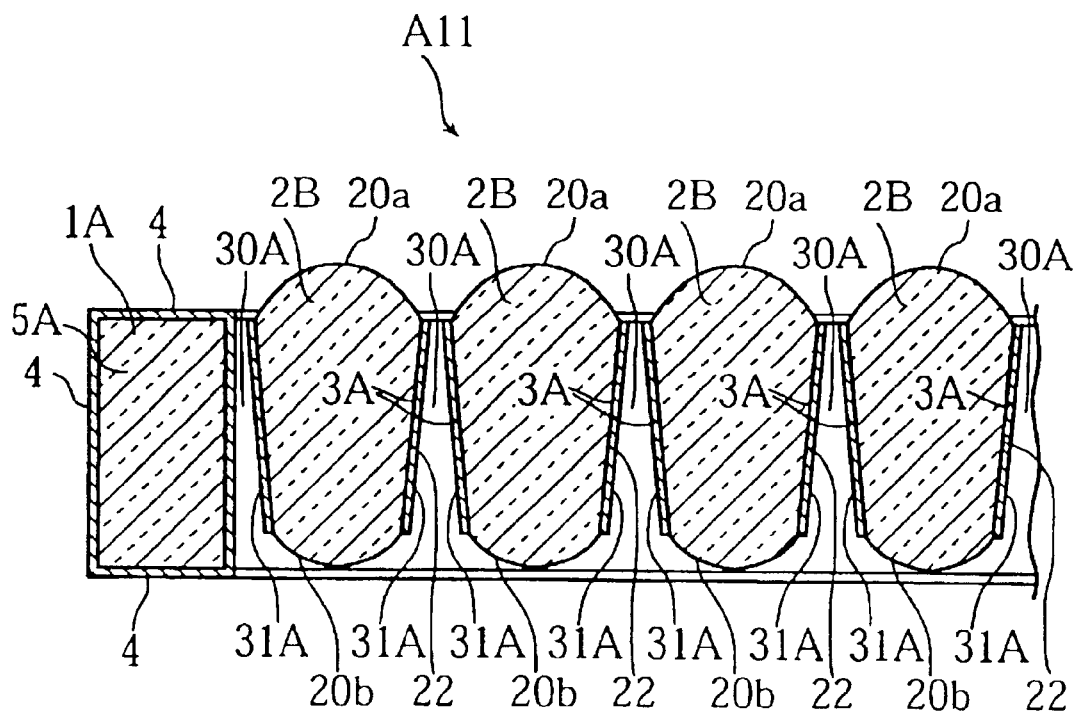
FIG. 20 is a sectional view taken along lines X3—X3 in FIG. 18.

As shown in FIG. 20, each lens 2B has downwardly tapered side surfaces 22. A black coating film 31A serving as light shielding portions 3A are applied to wall surfaces defining the hollows 30A. (Portions of the coating film 31A are directly provided on the side surfaces 22 of each lens 2B.)

As shown in FIG. 18, the body 5A has longitudinal side surfaces which are formed, at the bottom thereof, with a plurality of recesses 10c spaced from each other. Although only one of the two longitudinal side surfaces of the body 5A is shown in FIG. 18, the other longitudinal side surface is similarly formed with recesses. When the lens array A11 is used as combined with another lens array, these recesses 10c are utilized for positioned the two lens arrays.

Figure 21:
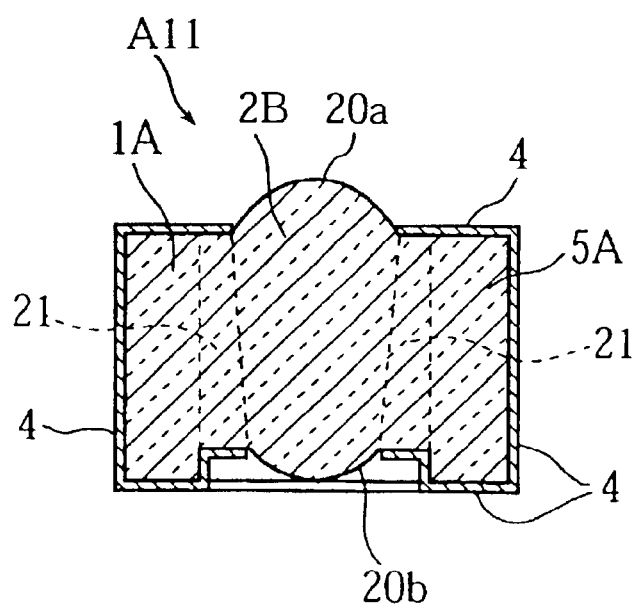
FIG. 21 is a sectional view taken along lines X4—X4 in FIG. 18.

As clearly shown in FIGS. 20 and 21, the outer surface of the holder portion 1A is entirely (or generally entirely) provided with a black light-shielding film 4. The light-shielding film 4 and the coating film 31A of the light-shielding portions 3 may be provided by process steps which are similar to those for making the light-shielding film 4 and the coating film 31 of the lens array A1 described before.

Figure 22:
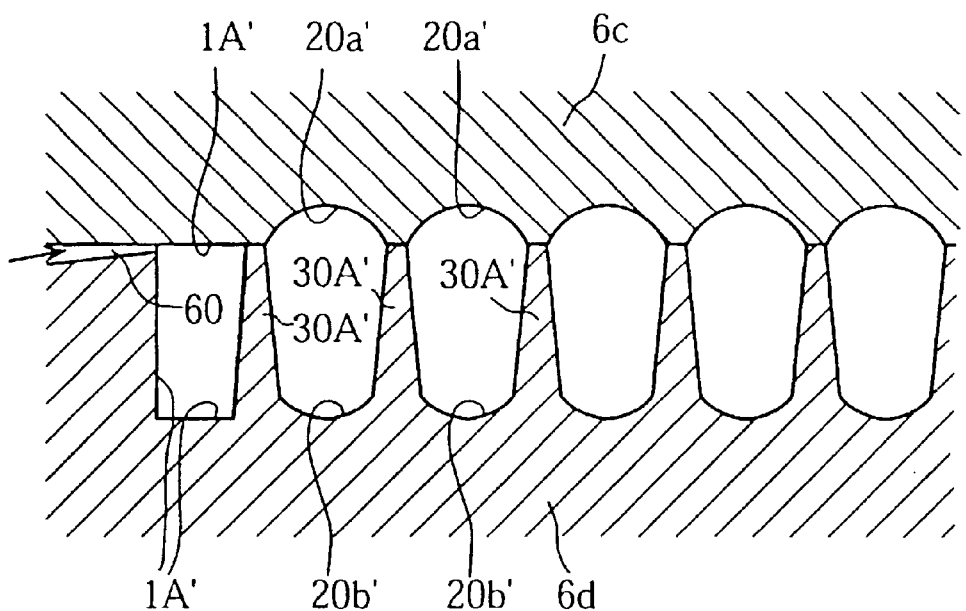
FIG. 22 is a sectional view of a principal portion in a step for molding the lens array of FIG. 20.
Figure 23:
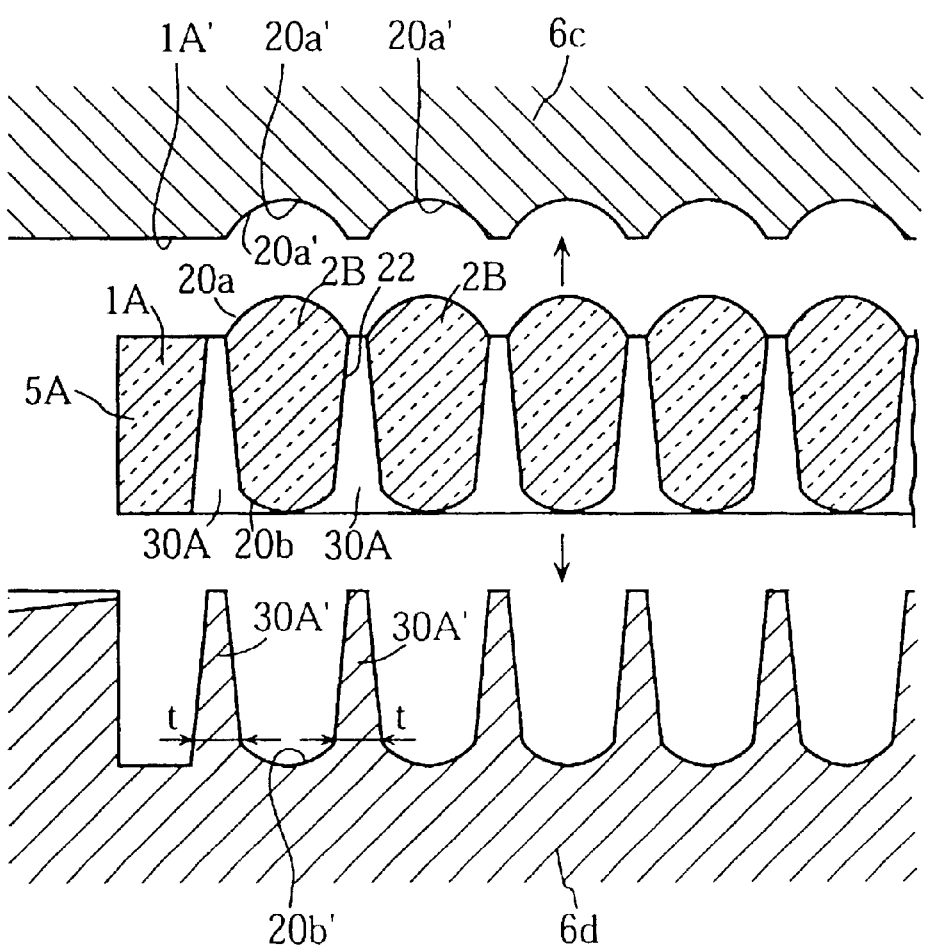
FIG. 23 is a sectional view of a principal portion in a step following the step shown in FIG. 22.

FIGS. 22 and 23 are sectional views showing the steps for resin-molding the lens array A11. As shown in these figures, an upper mold member 6c is formed with a plurality of recesses 20a' corresponding to upper surfaces 20a of respective lenses 2B. A lower mold member 6d is formed with a plurality of recesses 20b corresponding to lower surfaces 20b of respective lenses 2B, and a plurality of projections 30A' for forming hollows 30A. Further, the upper and the lower mold members 6c, 6d include a plurality of wall surfaces 1A' for profiling the holder portion 1A.

As previously described, each of the lenses 2B is downwardly tapered. Accordingly, each of the projections 30A' for defining side surfaces of each lens 2B has a downwardly increasing wall thickness t.

Figure 24:
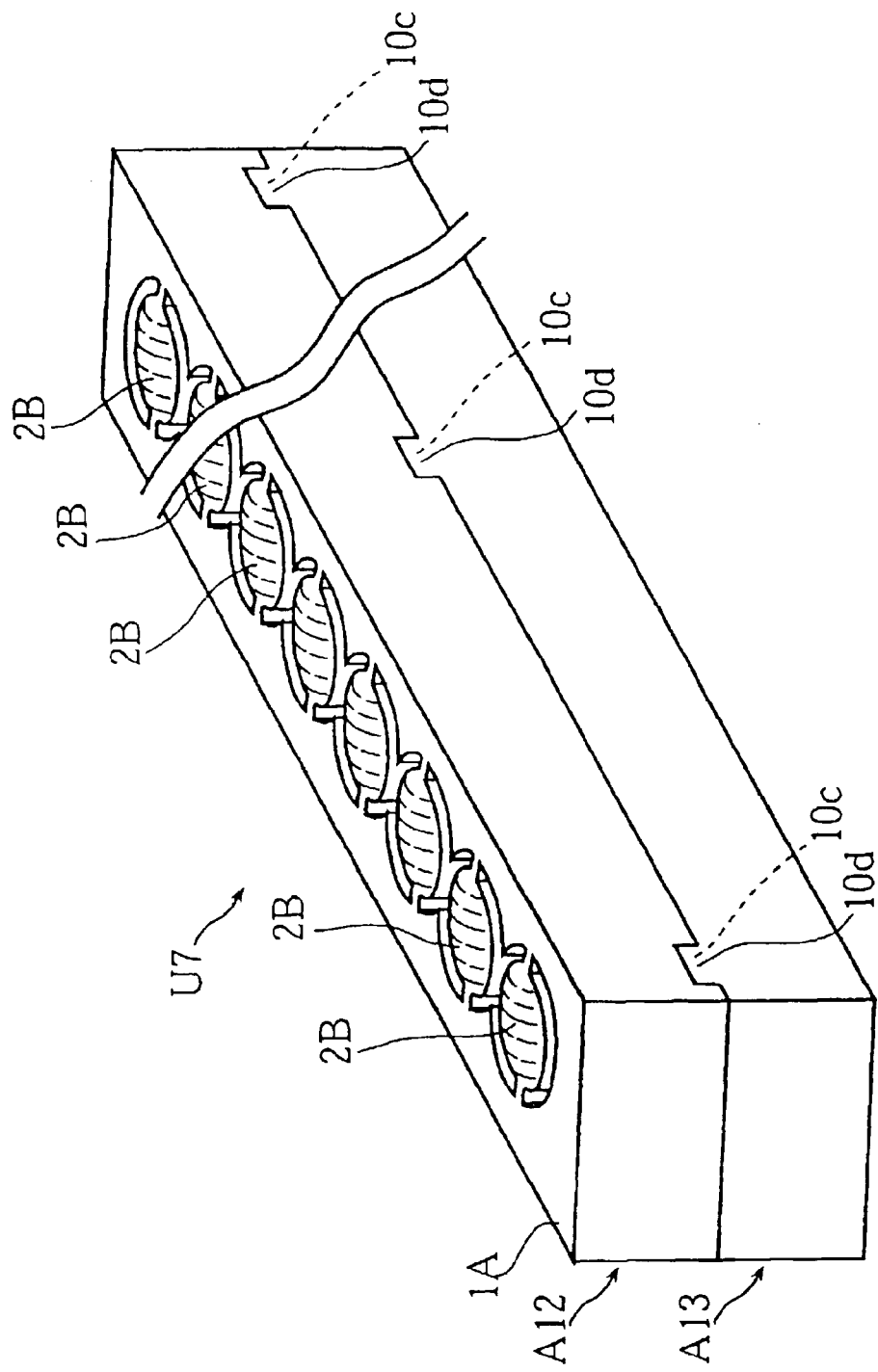
FIG. 24 is a perspective view showing a lens unit in accordance with a seventh embodiment of the present invention.
Figure 25:
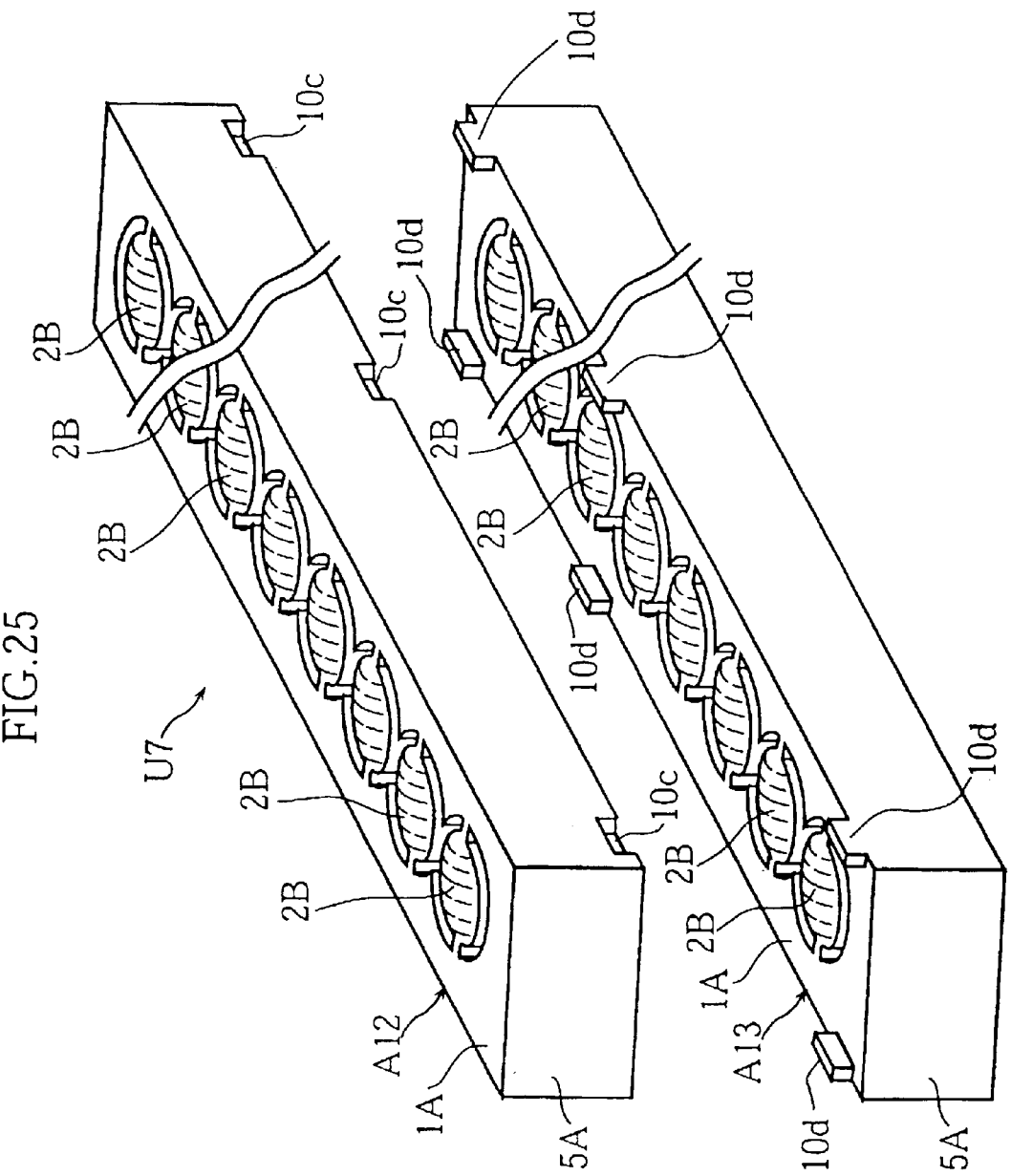
FIG. 25 is an exploded perspective view of the lens unit shown in FIG. 24.
Figure 26:
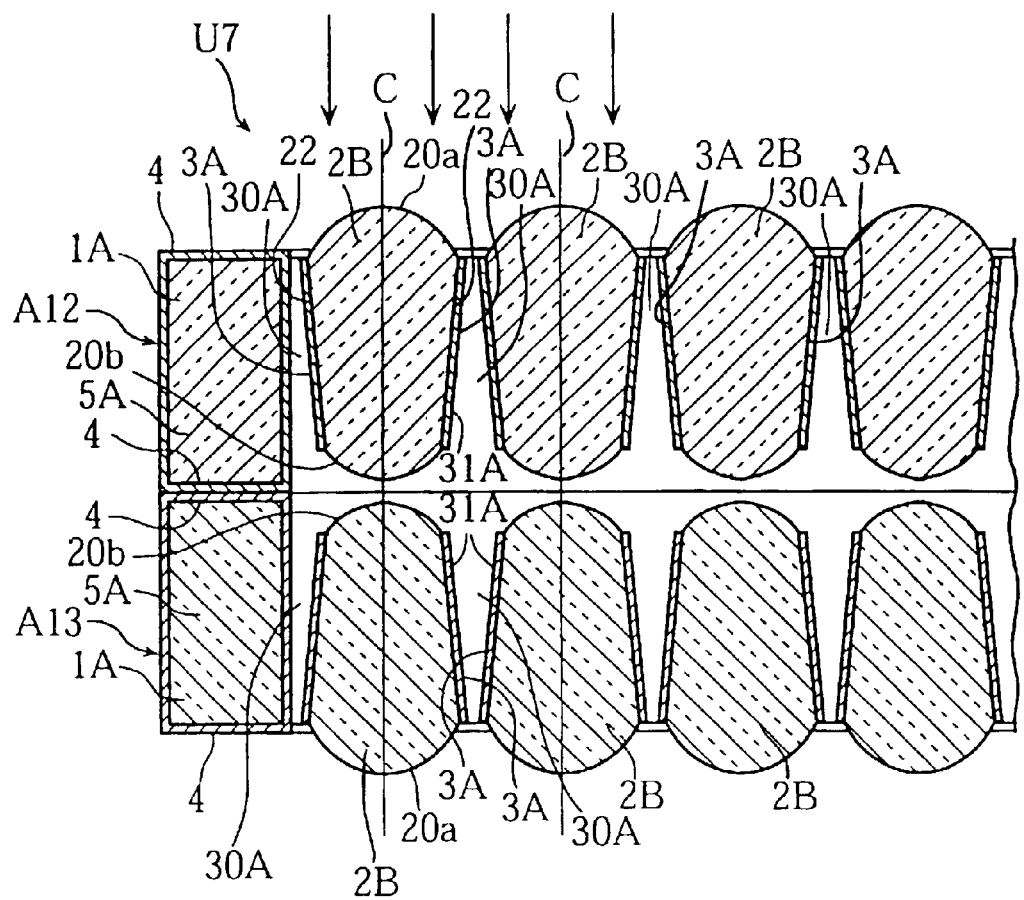
FIG. 26 is a sectional view of the lens unit shown in FIG. 24.

FIGS. 24–26 are views showing a lens unit U7 in accordance with a seventh embodiment of the present invention. The lens unit U7 comprises a combination of two lens arrays A12 and A13. The upper lens array A12 is (substantially) identical to the lens array A11 shown in FIG. 18. The structure of the lower lens array A13 is basically identical to that of the upper lens array A12 except that the lower lens array A13 is formed with a plurality of projections 10d instead of positioning recesses, and that each of the lenses 2B is upwardly tapered. As shown in FIGS. 24 and 25, each projection 10d of the lens array A13 is fitted in a corresponding recess 10c of the lens array A12. With this structure, as shown in FIG. 26, lenses 2B of the lens array A12 are appropriately positioned relative to the lenses 2B of the lens array A13.

Each lens 2B of the lens arrays A12, A13 is covered with a black coating film 31A (light-shielding portions 3A) except the upper and the lower surfaces. With this structure, light reaching the side surface 22 of each lens 2B is absorbed by the light-shielding portion 3A. Therefore, it is possible to prevent light from being reflected by the side surface 22 and scattered within the lens 2B. The light-shielding portions 3A further prevent light entering one lens 2B from subsequently entering adjacent lens 2B.

Figure 27:
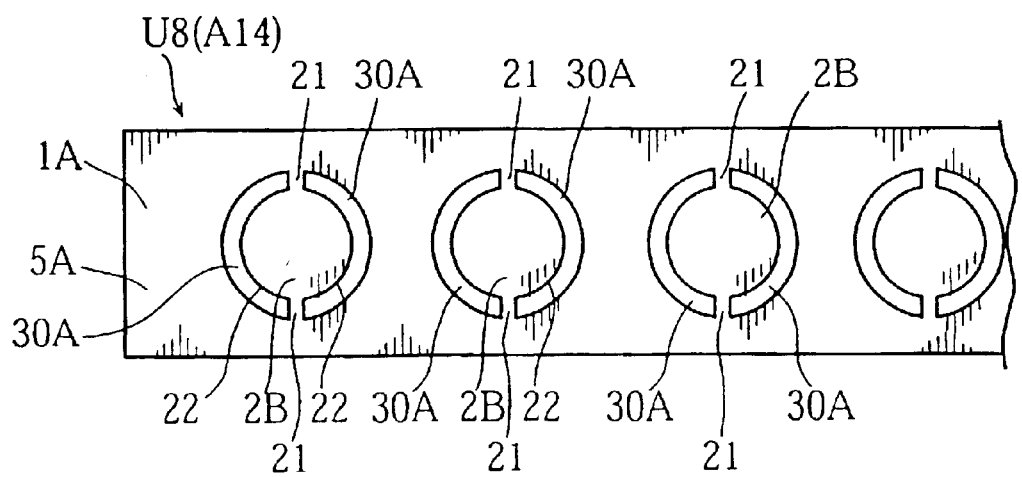
FIG. 27 is a plan view showing a principal portion of a lens array in accordance with an eighth embodiment of the present invention.

FIG. 27 illustrates a lens unit U8 (lens array A14) in accordance with an eighth embodiment of the present invention. Unlike the lens array A11 shown in FIG. 19, a plurality of hollows 30A are so formed in the lens array A14 of this embodiment as to be separated from each other. The lens array A11 is advantageous in that each hollow 30A is merged with adjacent hollow 30A so that the plurality of lenses 2B can be arranged at relatively small pitches. Contrary to this, the lens array A14 may be used in the case where the pitch between the lenses need not be made so small.

Figure 28:
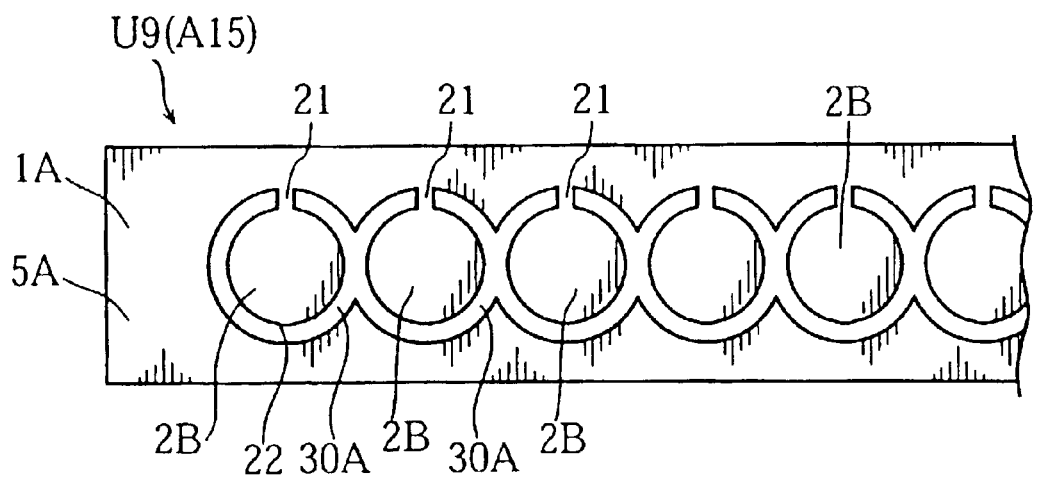
FIG. 28 is a plan view showing a principal portion of a lens array in accordance with a ninth embodiment of the present invention.

FIG. 28 is a plan view showing a lens unit U9 (lens array A15) in accordance with a ninth embodiment of the present invention. In this embodiment, the hollows 30A merge with each other. Each of the lenses 2B is joined to the holder portion 1A via a single connecting portion 21.

As described above, when hollows are provided around the lenses, each lens may be connected to the holder portion via at least one connecting portion. As the number of connecting portions and the width of each connecting portion become smaller, the side surface area of each lens becomes larger as much, which leads to enhancement of the optical characteristics of the lens.

Figure 29:
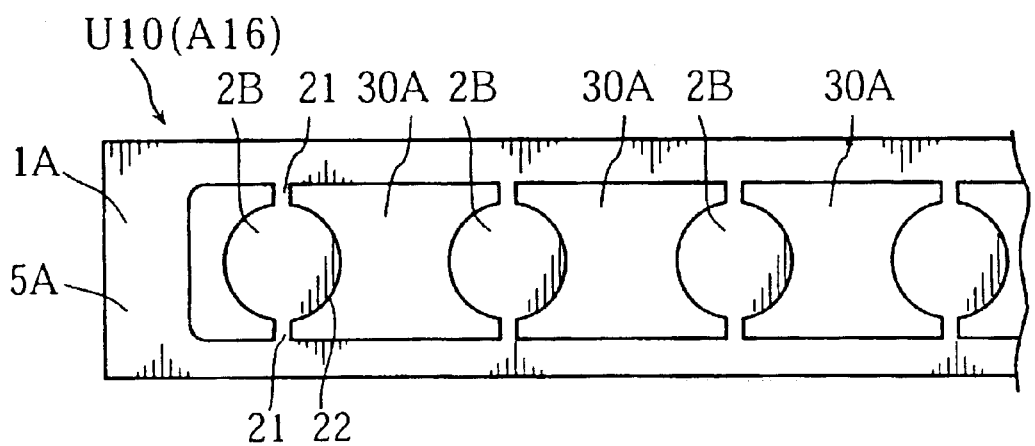
FIG. 29 is a plan view showing a principal portion of a lens array in accordance with a tenth embodiment of the present invention.

FIG. 29 is a plan view illustrating a lens unit U10 (lens array A16) in accordance with a tenth embodiment of the present invention. In this embodiment, hollows 30A surrounding the side surfaces 22 of the lenses 2B are relatively large. Such a structure can also be employed in the present invention. However, if the lens array A16 is used as it is, light may easily pass through the hollows 30A, causing disadvantages. Therefore, in using the lens array A16, openings of the hollows 30A may preferably be closed with appropriate members for preventing light from entering the hollows 30A.

Figure 30:
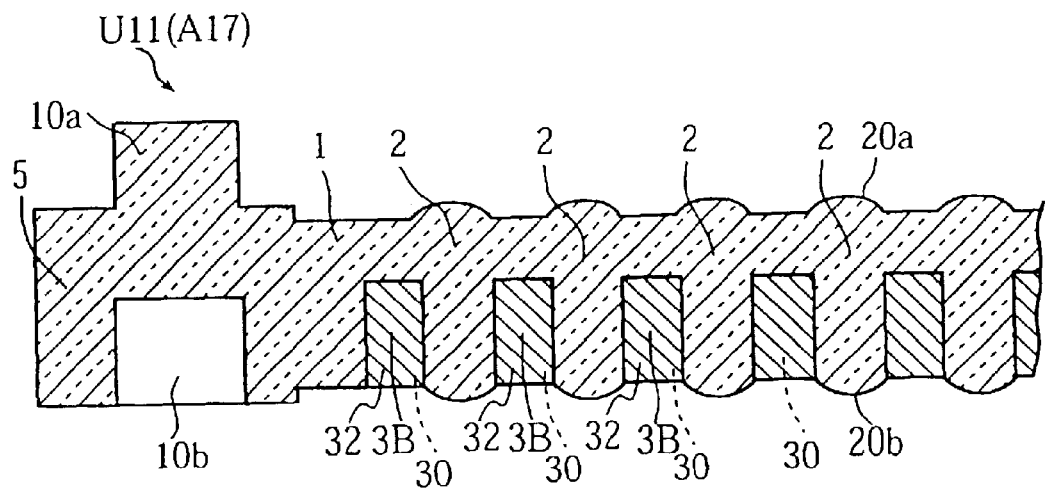
FIG. 30 is a sectional view showing a lens array in accordance with an eleventh embodiment of the present invention.

FIG. 30 is a sectional view illustrating a lens unit U11 in accordance with an eleventh embodiment of the present invention. This lens unit U11 includes a single lens array A17. As shown in the figure, the lens array A17 includes a plurality of lenses 2, and hollows 30 each of which is arranged between two adjacent lenses. Each of the hollows 30 is provided with a light-shielding portion 3B formed by loading (or inserting) a black material (or member) into the hollow. Also with this structure, the light-shielding portions 3B absorb most parts of received light, thereby preventing cross talk between the lenses 2. For obtaining high light-absorbing ability, a black light shielding portion is most preferable, but a dark color close to black may be also acceptable. However, the color of the light-shielding portions in the present invention is not limited to these.

Figure 31:
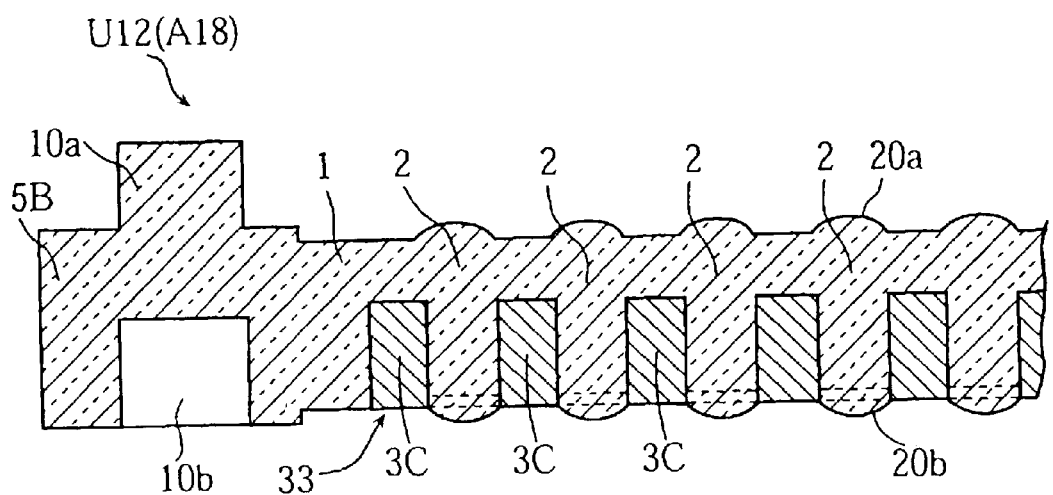
FIG. 31 is a sectional view showing a lens array in accordance with a twelfth embodiment of the present invention.
Figure 32:
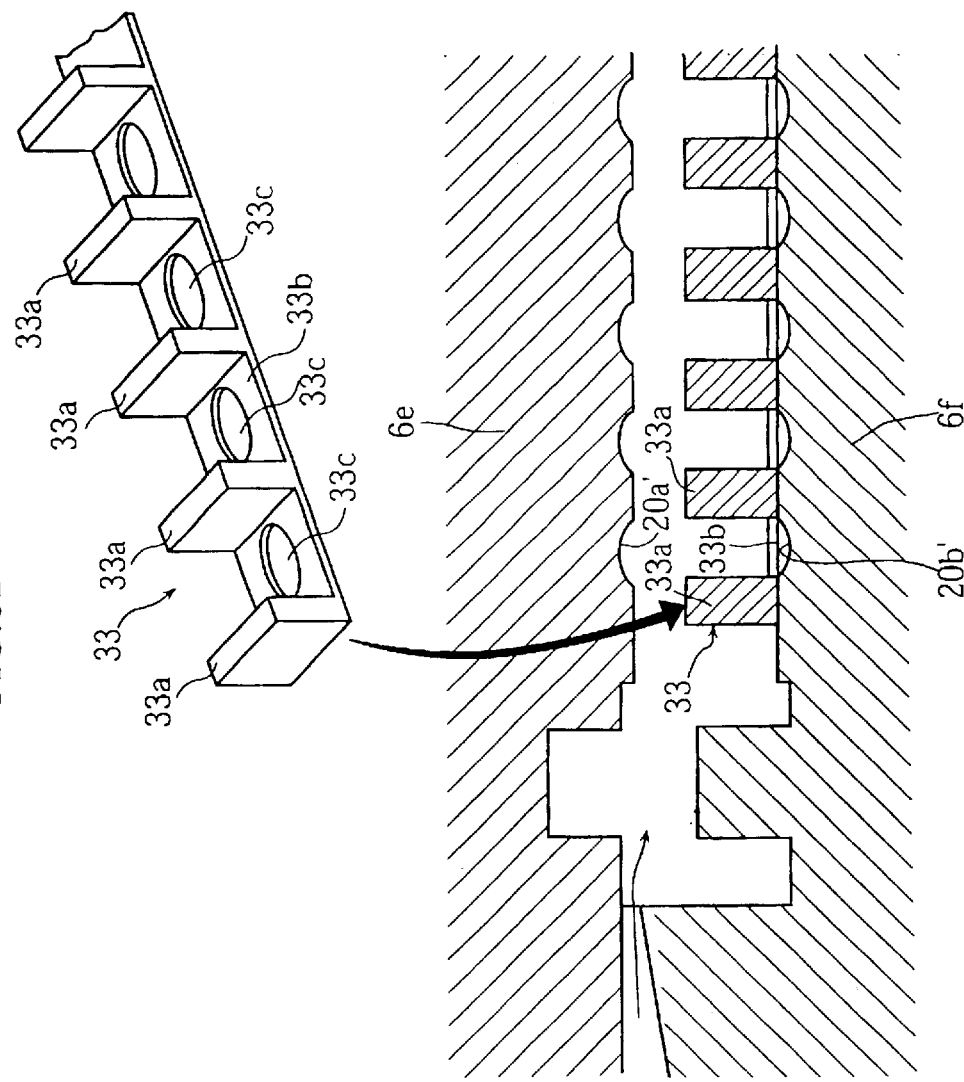
FIG. 32 is a sectional view of a principal portion in a step for making the lens array shown in FIG. 31.

FIG. 31 is a sectional view showing a lens unit U12 in accordance with a twelfth embodiment of the present invention. This lens unit U12 includes a single lens array A18. As shown in the figure, the lens array A18 is not formed with hollows between respective two adjacent lenses 2. Instead, a black member 33 is provided as entirely or partially embedded in a body 5B. The member 33 provides a plurality of light-shielding portions 3C arranged between respective two adjacent lenses 2. As shown in FIG. 32, the body 5B may be formed by insert-molding wherein the member 33 is inserted in the cavity defined by a pair of mold members 6e, 6f during the molding. The member 33 comprises a plurality of rising portions 33a arranged at a predetermined pitch in a row and connected to each other by a connecting portion 33b. The connecting portion 33b is formed with a plurality of holes 33c provided for avoiding interruption of the molding of the lenses 2. With this resin-molding method, it is possible to easily provide the rising portions 33a (light-shielding portions 3C) between the mutually adjoining lenses 2 without the need for applying a coating or inserting the black member after the molding of the body 5B.

Figure 33:
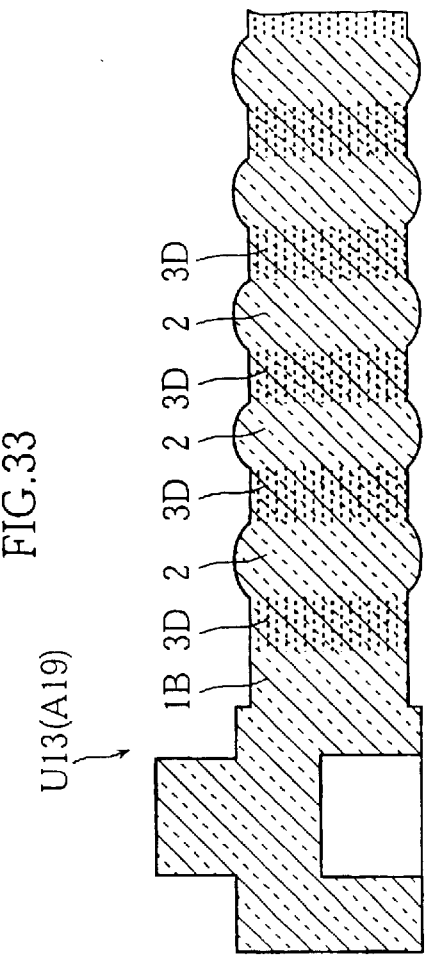
FIG. 33 is a sectional view showing a lens array in accordance with a thirteenth embodiment of the present invention.

FIG. 33 is a sectional view showing a lens unit U13 in accordance with a thirteenth embodiment of the present invention. The lens unit U13 includes a single lens array A19. As shown in the figure, the lens array A19 has a holder portion 1B which includes a plurality of opaque portions. Specifically, the opaque portions, which are arranged between respective adjacent lenses, have black color or dark color close to black. As will be easily understood, the opaque portions serve as light-shielding portions 3D. The holder portion 1B including opaque portions may be formed by molding a lens array A19 from a photo-sensitive resin and irradiating appropriate portions of the resin with light of a predetermined wavelength.

Figure 34:
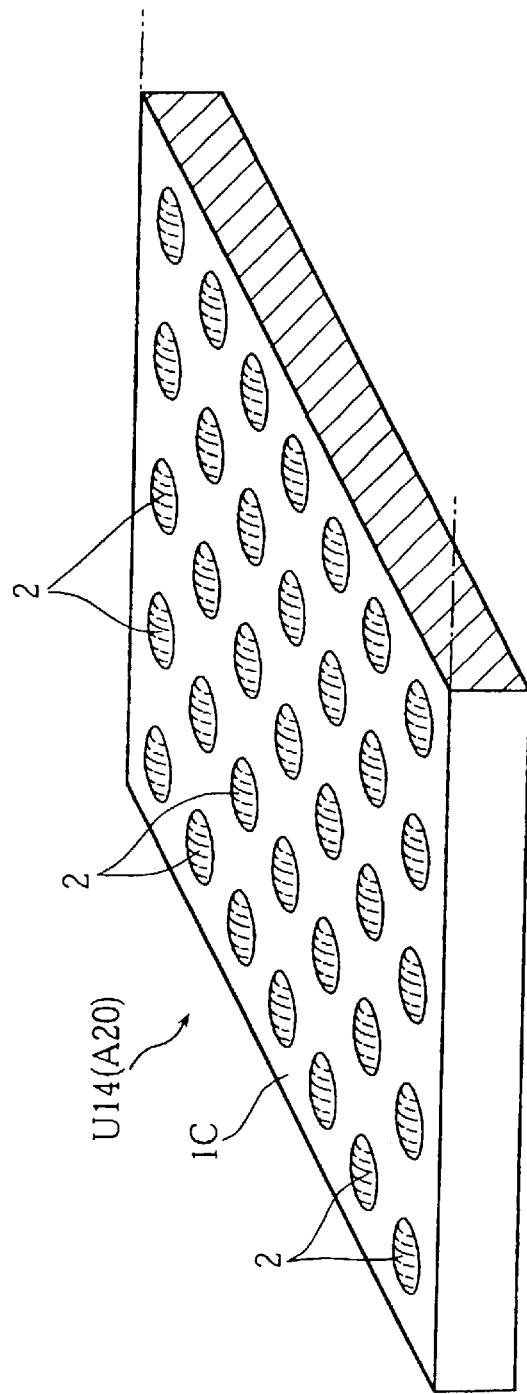
FIG. 34 is a perspective view schematically showing a lens array in accordance with a fourteenth embodiment of the present invention.

FIG. 34 is a perspective view schematically showing a lens unit U14 in accordance with a fourteenth embodiment of the present invention. The lens unit U14 includes a single lens array A20. As shown in the figure, the lens array A20 includes a rectangular holder portion 1C and a plurality of lenses 2 arranged in a matrix. With such a structure, it is possible to form a two-dimensional image at a predetermined position.

According to the present invention, a lens unit may comprise two or more lens arrays A20. Such a lens unit may be disposed in front of a display comprising a CRT or a liquid crystal device. With this arrangement, it is possible to form, in front of the display, an actual size erect image of an image on the display.

Figure 35:
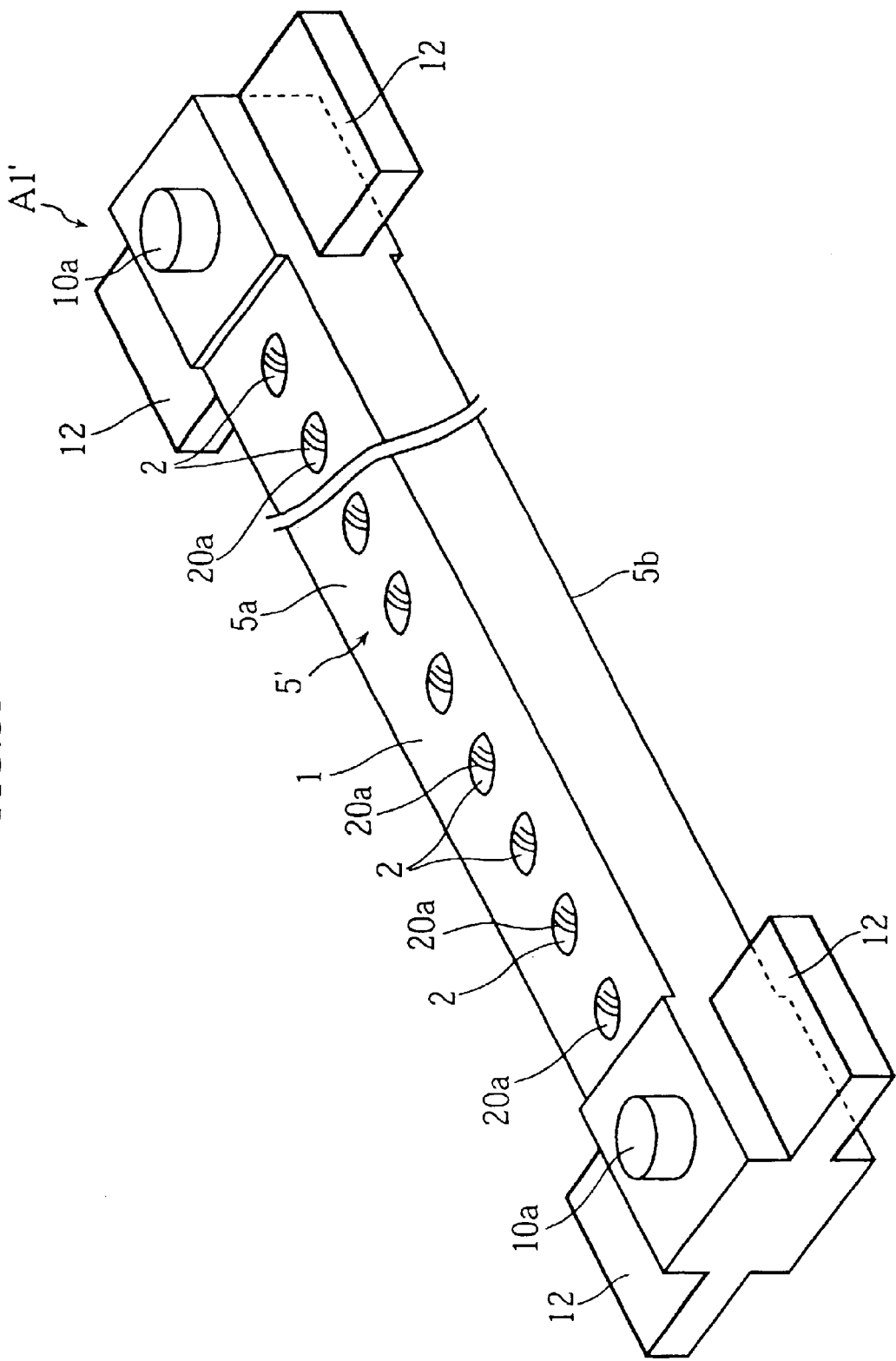
FIG. 35 is a sectional view showing a modified lens array in accordance with the present invention.
Figure 36:
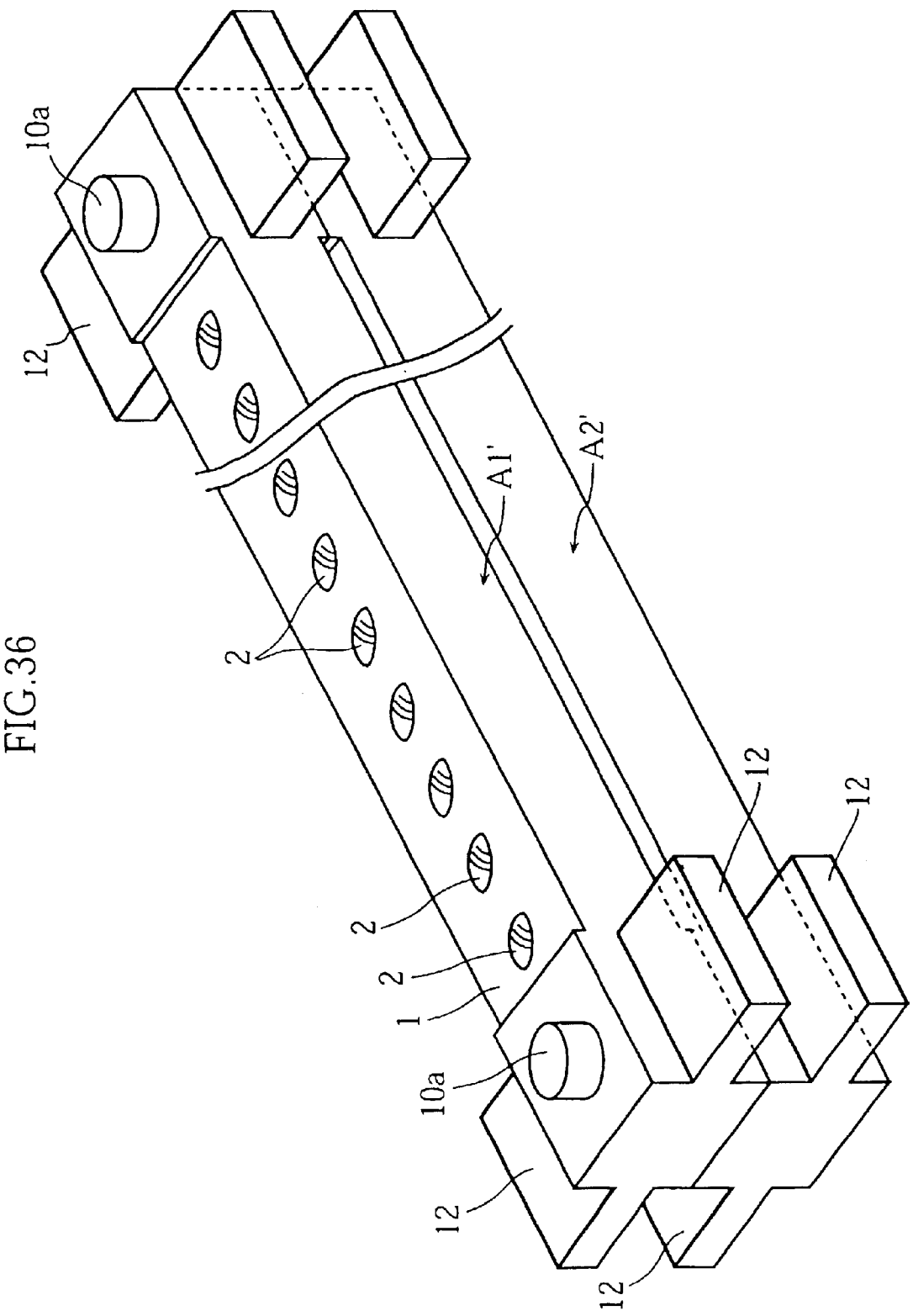
FIG. 36 is a perspective view showing a lens unit comprising the lens array shown in FIG. 35 and another lens array laminated thereon.

Next, reference is made to FIG. 35. A lens array A1' illustrated in the figure is basically identical, in structure, to the lens array A1 shown in FIG. 1. However, the lens array A1' includes a holder portion 1 formed with wings 12 projecting horizontally from respective ends of the holder portion 1. The wings 12 are integrally formed on the holder portion 1. FIG. 36 illustrates an assembly of the lens array A1' and another lens array A2'. The lower lens array A2' is identical to the upper lens array A1'. Though not shown in FIGS. 35 and 36, each of the lens arrays A1', A2' is provided with light-shielding means (of the type as shown in FIGS. 2 and 3).

Figure 37:
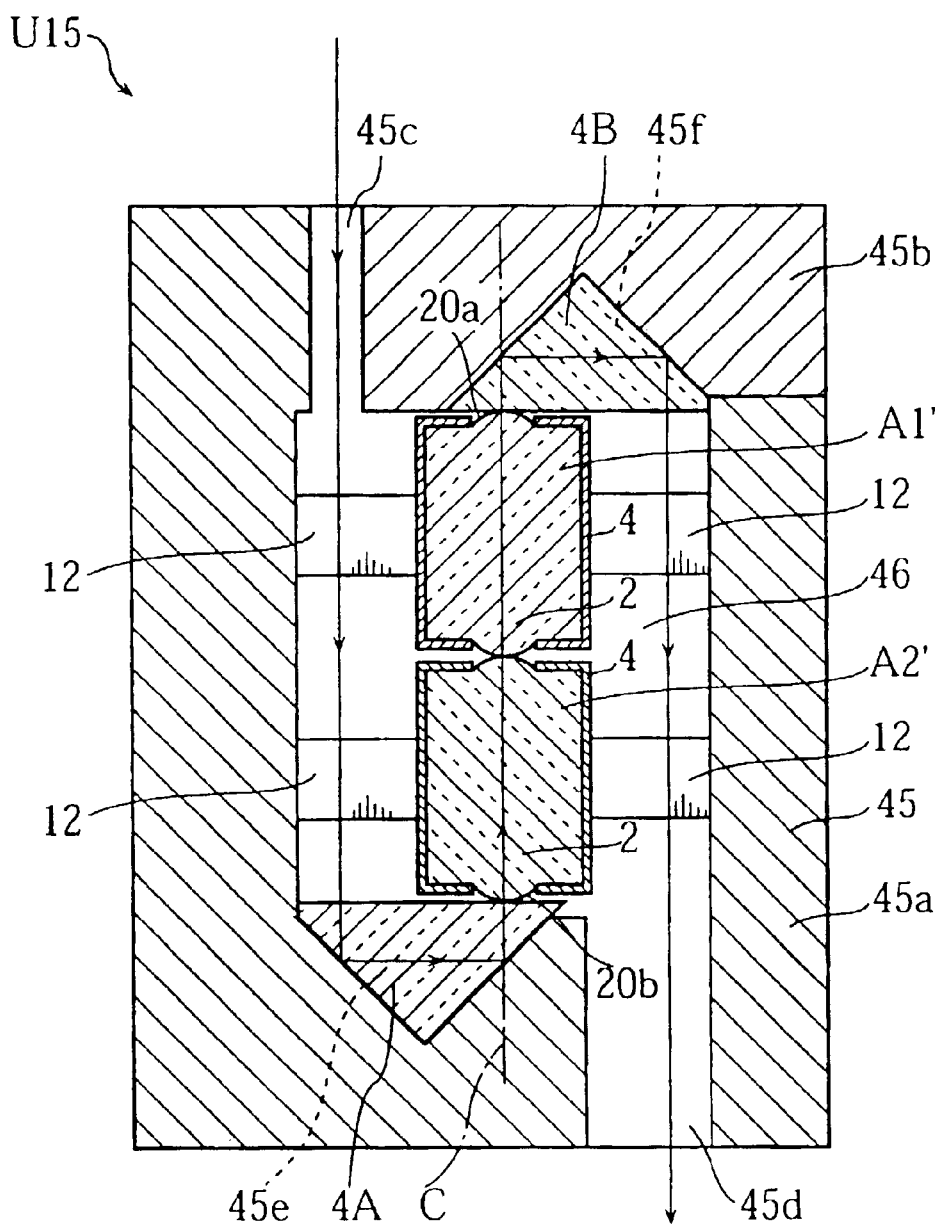
FIG. 37 is a sectional view showing the lens unit of FIG. 36 accommodated in a housing.

FIG. 37 is a sectional view illustrating a lens unit U15 in accordance with a fifteenth embodiment of the present invention. As can be understood from the figure, the lens unit U15 includes the lens array assembly shown in FIG. 36. The lens unit U15 further includes a housing 45 for accommodating the lens array assembly, and two prisms 4A, 4B held in the housing. The housing 45, which may be entirely formed of a black synthetic resin, is in the form of a box including a hollow portion 46 for accommodating the lens arrays A1', A2' and prisms 4A, 4B.

The housing 45 includes a body 45a upwardly formed with an opening, and a complementary member 45b attached to the opening. With such a structure, necessary parts can be inserted through the opening into the body 45a before the complementary member 45b is attached. The lens arrays A1', A2' are fixed in the housing 45 by bringing the wings 12 into contact with the housing 45 or into engagement with recesses or projections (not shown) formed in the housing 45.

The housing 45 is upwardly formed with an upper slit 45c and downwardly formed with a lower slit 45d. The upper and the lower slits 45c, 45d extend longitudinally of the lens arrays A1', A2', and communicate with the hollow portion 46. In FIG. 37, the upper slit 45c is spaced leftward from the optical axes C of the lenses 2, whereas the lower slit 45d is spaced rightward from the optical axes C of the lenses 2. With this structure, light traveling downward enters the housing 45 through the upper slit 45c, and light traveling downward within the housing 45 exits the housing through the lower slit 45d.

As shown in FIG. 37, the two prisms 4A, 4B are provided for changing directions of the light traveling within the housing 45. Each of the prisms 4A, 4B extends longitudinally of the lens arrays A1', A2', and is triangular in section. (In the example shown in FIG. 37, the cross section is in the form of a right-angled isosceles triangle.)

The lower prism 4A is fitted in a recess 45e provided in the body 45a and located below the lens array A2'. The prism 4A has a surface (light-receiving and light-emitting surface) facing the upper slit 45c and the lower surfaces 20b of the lenses 2 of the lens array A2'. With this structure, the light traveling downward in the housing 45 is directed upward by the operation of the prism 4A. Thereafter, the light passes through the lenses 2 of the lens arrays A1', A2'.

As shown in FIG. 37, the upper prism 4B is fitted in a recess 45f provided in the complementary member 45b and located above the lens array A1'. The prism 4B has a surface (light-receiving and light-emitting surface) facing the lower slit 45d and upper surfaces 20a of the lenses 2 of the lens array A1'. With this structure, the light traveling upward after exiting the lens array A1' is directed downward by the operation of the prism 4B. Thereafter, the light exits the housing 45 through the lower slit 45d.

Figure 38:
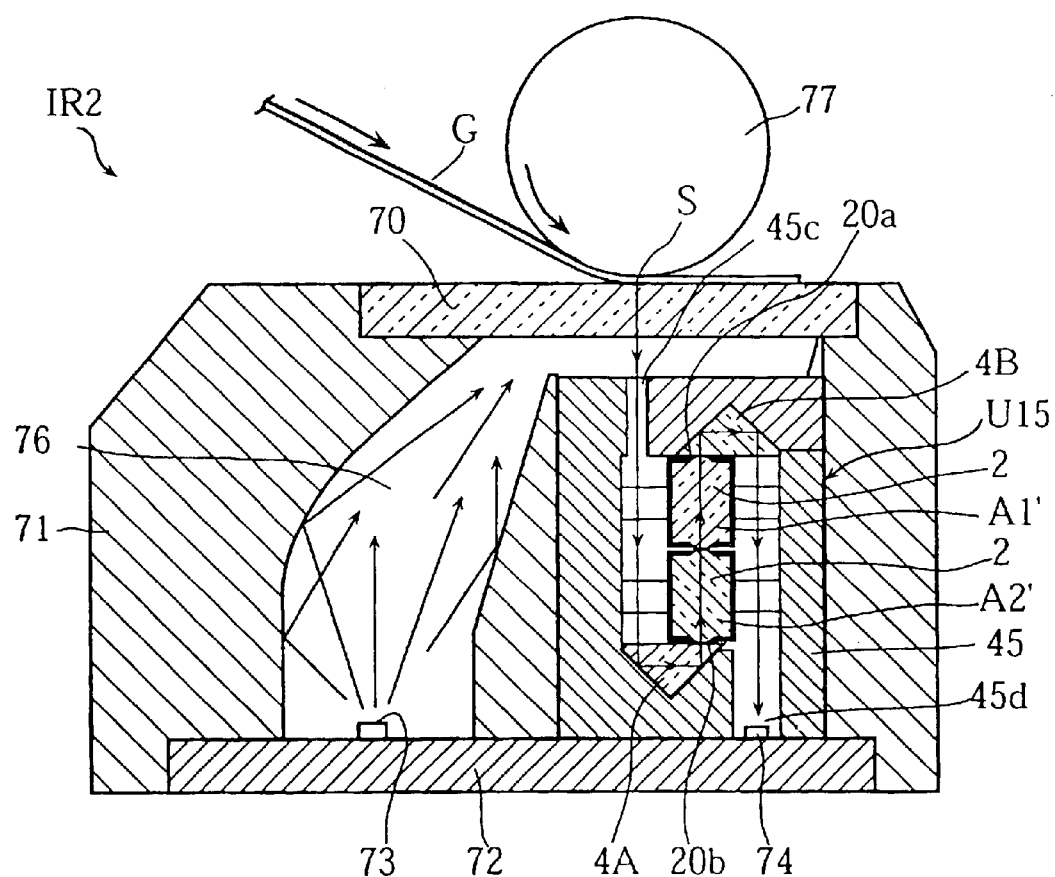
FIG. 38 is a sectional view showing an image reading apparatus utilizing the lens unit of FIG. 37.

FIG. 38 is a sectional view illustrating an image reading apparatus IR2 incorporating the lens unit U15 shown in FIG. 37. The image reading apparatus IR2 includes, in addition to the lens unit U15, a transparent plate 70, a case 71 holding the transparent plate 70, and a substrate 72 disposed at the bottom of the case 71. A plurality of light sources 73 and a plurality of light receiving elements 74 are provided on the substrate 72. The lens unit U15 is so held between the transparent plate 70 and the substrate 72 as to extend in the primary scanning direction.

The transparent plate 70 has an obverse surface which includes an image read area S located directly above the upper slit 45c of the lens unit U15. The image read area S extends in the primary scanning direction. A platen roller 77 is provided in facing relationship to the image read area S.

The light sources 73, which may comprise light emitting diodes (LEDs), are arranged at the bottom of an illumination path 76 defined within the case 71. In the present invention, however, the kinds of light sources are not limited to specific ones, and use may be made of a light source comprising a cold cathode tube extending in the primary scanning direction, for example.

The case 71 may be made of e.g., a white synthetic resin, thereby having white wall surfaces defining the illumination path 76. Therefore, light emitted from the light sources 73 progresses toward the image read area S while being repetitively reflected by the white wall surfaces.

The light receiving elements 74 for photo-electric conversion are arranged on a surface of the substrate 72 in a row extending in the primary scanning direction. As shown in FIG. 38, the light receiving elements 74 are disposed in the lower slit 45d of the housing 45 of the lens unit U15 in facing relationship to the prism 4B.

Next, the operation of the image reading apparatus IR2 will be described.

Firstly, light emitted from the light sources 73 illuminates a document G on the transparent plate 70. The light reflected by the document G at a portion corresponding to the image read area S travels through the slit 45c of the lens unit U15 to enter the housing 45 to reach the first prism 4A. The light is then directed upward by the prism 4A to pass through the two lens arrays A1', A2' and then is directed downward by the second prism 4B. The light is finally received by the receiving elements 74, which output image signals corresponding the received amount of light.

Figure 42:
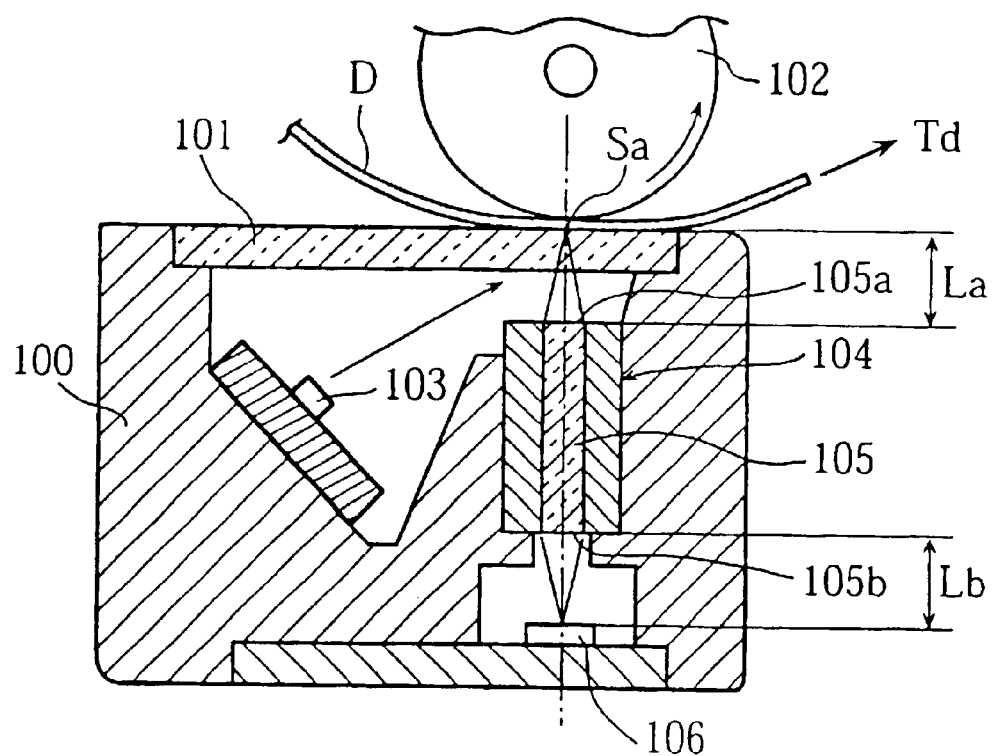
FIG. 42 is a sectional view showing an example of prior-art image reading apparatus.
Figure 43:
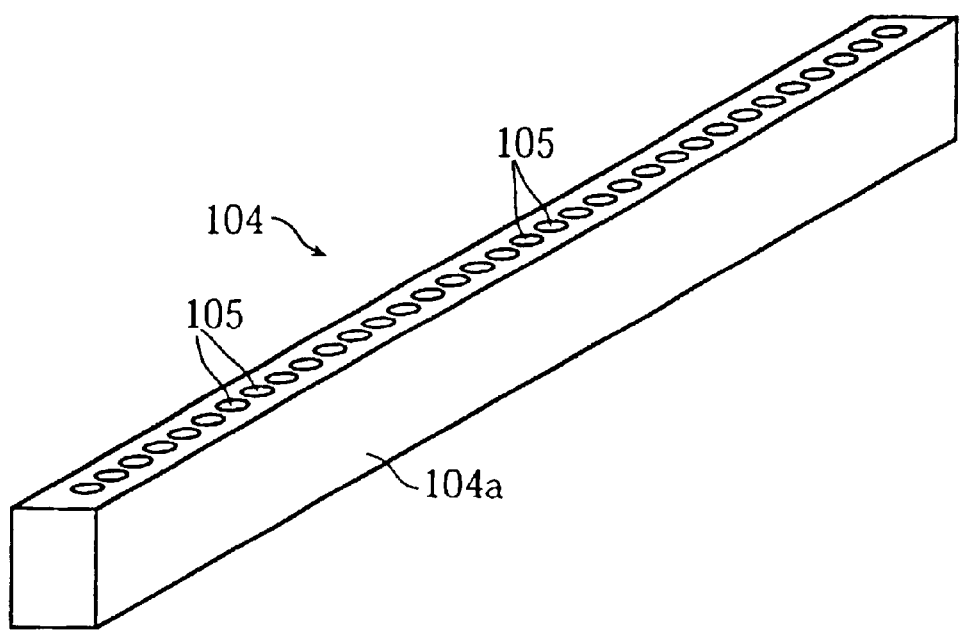
FIG. 43 is a perspective view showing an example of prior-art lens array.
Figure 44:
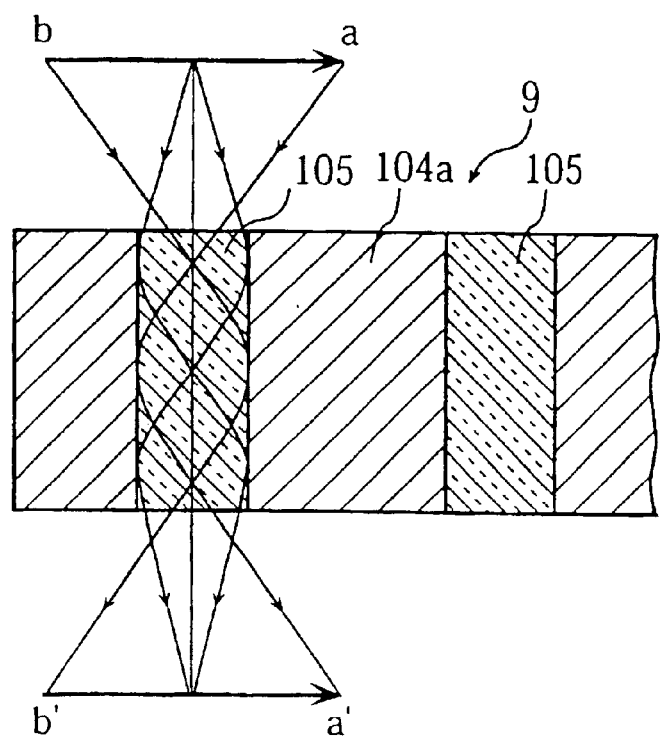
FIG. 44 is a sectional view of a principal portion of the prior art lens array shown in FIG. 43.

With the structure shown in FIG. 38, the light traveling from the image read area S reaches the lower surfaces 20b of the lenses 2 of the lens array A2' after passing through the lower (the first) prism 4A. As will be easily understood, the length of the light path extending from the image read area S to the lenses 2 of the lens array A2' is longer than the length La of the light path in the prior art structure shown in FIG. 42. Further, the light exiting the lenses 2 of the lens array A1' changes its traveling direction to downward by the operation of the upper (the second) prism 4B to reach the light receiving elements 74. With such a structure, the length of the light path extending from the lenses 12 of the lens array A1' to the light receiving elements 74 is also longer than the length Lb of the prior art structure shown in FIG. 42.

Even when the focal depth of the lenses 2 of the two lens arrays A1', A2' is made larger (i.e., the focal length is made larger) as a result of making the two light paths longer as described above, it is possible to appropriately form a document image on the light receiving elements 74 without considerably increasing the overall height of the image reading apparatus IR2. Moreover, since both the light path from the image read area S to the lenses 2 of the lens array A2' and the light path from the lenses 2 of the lens array A1' to the light receiving elements 74 extend in parallel to the light axes of the lenses 2, an increase of the width of the lens unit U15 (which leads to an increase of the width of the image reading apparatus IR2) can be avoided.

Therefore, according to the present invention, it is possible to provide a compact image reading apparatus which is capable of reading images without blurring even when the document G rises from the transparent plate 70.

Moreover, in the illustrated structure, the light receiving elements 74 are surrounded by the housing 45. Therefore, it is possible to prevent light from the outside of the image reading apparatus IR2 from disadvantageously reaching the light receiving elements 74. Further, since the housing 45 of the lens unit U15 is black, the light traveling from the prism 4B toward the light receiving elements 74 is not reflected by the walls surfaces of the housing 45. As a result, the light detected by the light receiving elements 74 hardly includes noises. Therefore, with the image reading apparatus IR2, it is possible to obtain a read image which is faithful to an original image.

Figure 39:
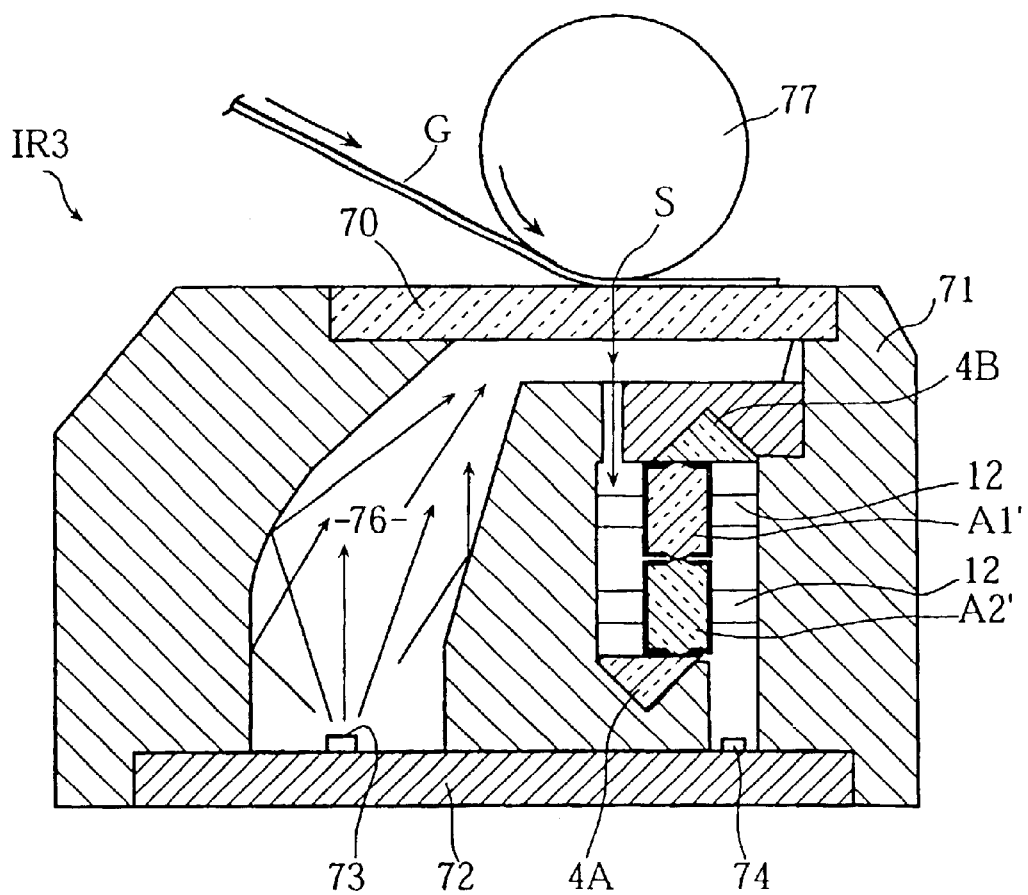
FIG. 39 is a sectional view showing a modification of the image reading apparatus of FIG. 37.

FIG. 39 is a sectional view illustrating another example of image reading apparatus having the above-described advantages. The illustrated image reading apparatus IR3 is basically identical to the image reading apparatus IR2 shown in FIG. 38 except that two lens arrays A1', A2' and a lower prism 4A are directly fixed to a case 71. The image reading apparatus IR3 does not include any member which corresponds to the housing 45 of the image reading apparatus IR2 shown in FIG. 38. Preferably, lens arrays A1', A2' and portions around the prisms 4A, 4B are black. As a result, light can be prevented from being reflected and scattering at the wall surfaces defining the light path extending from the image read area S to the light receiving elements 74.

Figure 40:
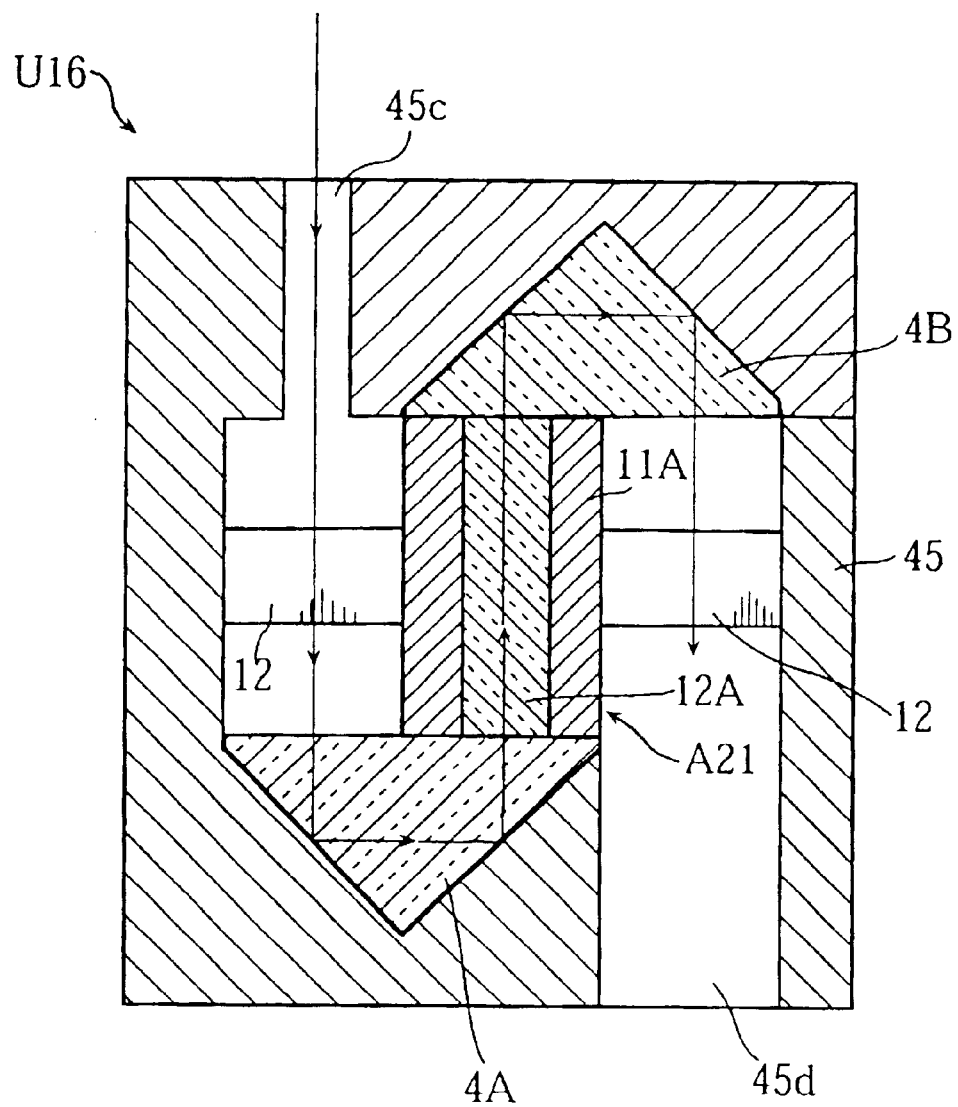
FIG. 40 is a sectional view showing a lens unit in accordance with a sixteenth embodiment of the present invention.

FIG. 40 is a sectional view illustrating a modification of the lens unit according to the present invention. The illustrated lens unit U16 utilizes a lens array 21 having a plurality of selfoc lenses 12A. In the lens array 21, the selfoc lenses 12A are arranged at a predetermined pitch in a row and embedded in a holder portion 11A made of resin. The holder portion 11A is provided with wings 12 for enabling positioning relative to the housing 45. According to the present invention, an image reading apparatus may incorporate the lens unit U16 instead of the lens unit U15 shown in FIG. 38. Moreover, instead of the selfoc lenses 12A, use may be made of lenses comprising optical fibers.

Figure 41:
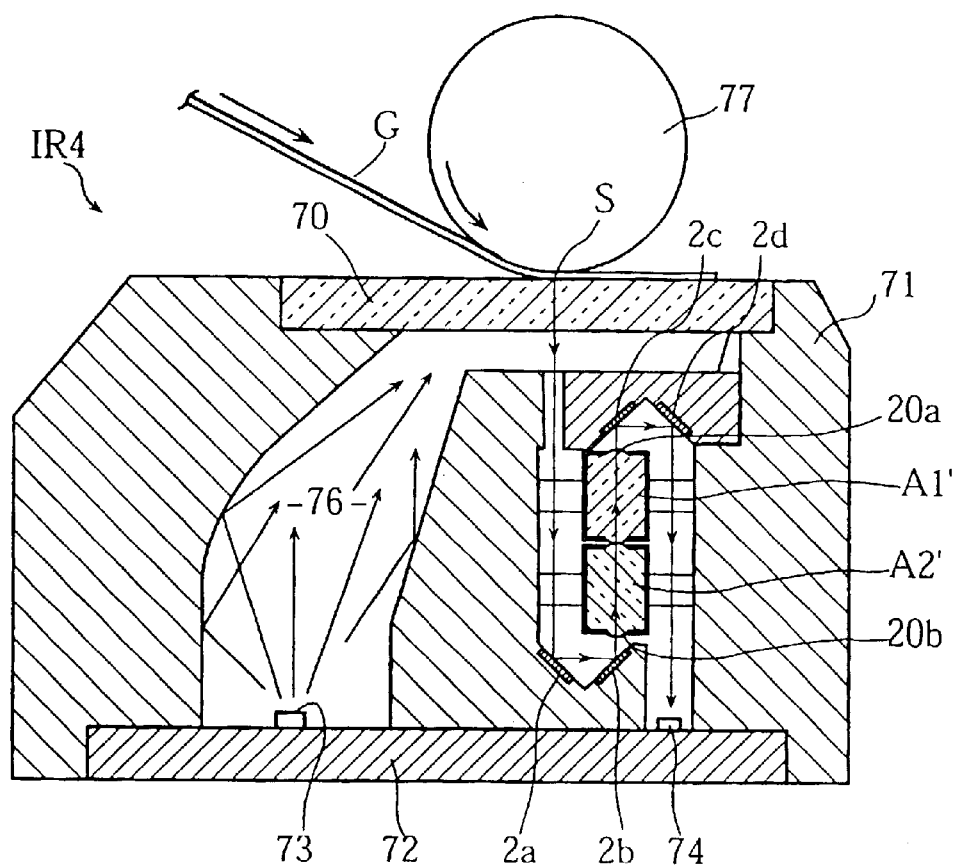
FIG. 41 is a sectional view showing an example of image reading apparatus in accordance with the present invention.

FIG. 41 is a sectional view illustrating an image reading apparatus IR4 which is a modification of the image reading apparatus IR3 shown in FIG. 39. In the image reading apparatus IR4, a pair of mirrors 2a, 2b are used instead of the prism 4A (FIG. 39) and another pair of mirrors 2c, 2d are used instead of the prism 4B (FIG. 39), as can be seen from the figure. In this way, according to the present invention, a plurality of mirrors may be utilized for guiding light from the image read area to the light receiving elements. Moreover, in the present invention, the prism and the mirror may be utilized in combination.

What is claimed is:

1. A lens unit comprising:
   at least one lens array including a plurality of lenses each of which has a first surface and a second surface;
   a housing for accommodating the lens array;
   a first opening provided in the housing at a position which is closer to the first surface than to the second surface;
   a second opening provided in the housing at a position which is closer to the second surface than to the first surface;
   a first light guide means for changing a traveling direction of light from a first direction to a second direction opposite to the first direction, so that light traveling through the first opening into the housing is directed toward the second surface of the lens; and a second light guide means for changing the traveling direction of light from the second direction to the first direction so that light emitted from the first surface of the lens is directed toward the second opening.

2. An image reading apparatus comprising:

a lens unit including a plurality of lenses for collecting light traveling from a linear image read area, each of the lenses having a first surface and a second surface which is located farther from the image read area than the first surface; and a plurality of light receiving elements for receiving the collected light;

wherein the image reading apparatus further includes a first light guide means for changing a traveling direction of light from a first direction to a second direction opposite to the first direction, so that light traveling from the image read area is directed toward the second surface of said each lens, and a second light guide means for changing the traveling direction of light from the second direction to the first direction so that light emitted from the first surface of said each lens is directed toward the plurality of light receiving elements.

3. The image reading apparatus according to claim 2, wherein the light traveling from the image read area passes on one side of said each lens and then changes its traveling direction by the first light guide means to reach the second surface of said each lens, whereas the light emitted from the first surface of the lens changes its traveling direction by the second light guide means to pass the other side of said each lens to be received by the plurality of light receiving elements.

4. The image reading apparatus according to claim 2, wherein the first and the second light guide means each comprises a prism.

5. The image reading apparatus according to claim 2, wherein the first and the second light guide means each comprises a plurality of mirrors.

6. The image reading apparatus according to claim 2, wherein the lens unit includes a first lens array and a housing for fixing the first lens array, the first lens array, the first light guide means and the second light guide means being incorporated into the housing.

7. The image reading apparatus according to claim 6, wherein the housing is dark-colored, the plurality of light receiving elements being covered with the housing.

8. The image reading apparatus according to claim 6, further including a light source for illuminating the image read area, a case for accommodating the light source and the plurality of light receiving elements, the first lens array, the first light guide means and the second light guide means being directly attached to the case.

9. The image reading apparatus according to claim 6, wherein the first lens array includes a plurality of lenses, a holder portion which is integral with the lenses, and light-shielding portions each arranged between adjacent ones of the lenses for absorbing light.

10. The image reading apparatus according to claim 9, wherein the lens unit includes a second lens array including a plurality of lenses, the first and the second lens arrays being laminated on each other so that each lens of the first lens array and a corresponding one of the second lens array are aligned on a common optical axis.

11. The image reading apparatus according to claim 2, wherein each of the plurality of lenses comprises either a selfoc lens or a lens formed of optical fibers.

* * * * *